US012584618B2

(12) United States Patent
Smith

(10) Patent No.: US 12,584,618 B2
(45) Date of Patent: Mar. 24, 2026

(54) FLASHLIGHT GRIP

(71) Applicant: Lee Smith, Virginia Beach, VA (US)

(72) Inventor: Lee Smith, Virginia Beach, VA (US)

( * ) Notice: Subject to any disclaimer, the term of this patent is extended or adjusted under 35 U.S.C. 154(b) by 0 days.

(21) Appl. No.: 18/899,483

(22) Filed: Sep. 27, 2024

(65) Prior Publication Data

US 2025/0109843 A1 Apr. 3, 2025

Related U.S. Application Data

(60) Provisional application No. 63/663,320, filed on Jun. 24, 2024, provisional application No. 63/586,064, filed on Sep. 28, 2023.

(51) Int. Cl.

| | |
|---|---|
| ***F21V 21/40*** | (2006.01) |
| ***F21V 21/088*** | (2006.01) |
| ***F21V 23/04*** | (2006.01) |
| ***F41G 1/34*** | (2006.01) |
| ***F41G 1/35*** | (2006.01) |
| ***F41G 1/36*** | (2006.01) |
| ***F41G 11/00*** | (2006.01) |

(52) U.S. Cl.

CPC ........ *F21V 21/406* (2013.01); *F21V 21/0885* (2013.01); *F21V 21/40* (2013.01); *F21V 23/0421* (2013.01); *F41G 1/34* (2013.01); *F41G 1/35* (2013.01); *F41G 1/36* (2013.01); *F41G 11/001* (2013.01)

(58) Field of Classification Search

CPC ............... F21V 21/0885; F21V 21/406; F21V 23/0421; F21V 21/40; F41G 1/34; F41G 1/35; F41G 1/36; F41G 11/001

USPC .................................. 362/110, 111, 112, 113

See application file for complete search history.

(56) References Cited

U.S. PATENT DOCUMENTS 1,835,233 A * 12/1931 Lyhne ........................ F21L 4/00 362/112
2,716,184 A * 8/1955 Thomas .............. F21V 21/0885 362/396

(Continued)

FOREIGN PATENT DOCUMENTS

WO WO-9726482 A1 * 7/1997 .............. F21L 15/14

OTHER PUBLICATIONS

Thyrm. "SwitchBack Flashlight Rings" 2023. https://thyrm.com/product-category/switchback/.

(Continued)

*Primary Examiner* — Colin J Cattanach

(74) *Attorney, Agent, or Firm* — TROUTMAN PEPPER LOCKE LLP; Christopher J. Forstner; Aaron E. Johnston

(57) ABSTRACT

Disclosed embodiments may include devices and methods for a flashlight grip. The flashlight grip may include a handle with a mount configured to hold a flashlight. The mount may include a first mounting portion coupled to the handle and a second mounting portion coupled to the handle. The second mounting portion may be positioned opposite the first mounting portion. The first mounting portion and the second mounting portion may form a cavity. The flashlight grip may further include one or more connectors extending through the first mounting portion and the second mounting portion that may be used to tighten the first mounting portion and second mounting portion, thereby securing a flashlight in between the first mounting portion and the second mounting portion.

20 Claims, 12 Drawing Sheets

(56) References Cited

U.S. PATENT DOCUMENTS

| | | | | |
|---|---|---|---|---|
| 6,641,277 | B2 | 11/2003 | Smith | |
| 7,152,990 | B2 | 12/2006 | Kukuk | |
| 7,524,076 | B2 | 4/2009 | Kukuk | |
| 8,075,156 | B2 | 12/2011 | Steele et al. | |
| 8,985,804 | B2 | 3/2015 | Frazier | |
| 9,683,728 | B2 | 6/2017 | Ross et al. | |
| D814,086 | S | 3/2018 | Cooper | |
| 10,174,922 | B2 | 1/2019 | Wille | |
| D936,881 | S | 11/2021 | Eichelberger | |
| 2003/0058636 | A1 | 3/2003 | Smith | |
| 2006/0050502 | A1 | 3/2006 | Ross et al. | |
| 2008/0049418 | A1 | 2/2008 | Ross et al. | |
| 2009/0084016 | A1* | 4/2009 | Wu | F41G 1/35 42/90 |
| 2009/0190337 | A1 | 7/2009 | Steele et al. | |
| 2009/0201674 | A1* | 8/2009 | Ross | F41G 1/345 362/191 |
| 2010/0146835 | A1* | 6/2010 | McNulty, Jr. | F41C 23/02 361/232 |
| 2014/0126191 | A1* | 5/2014 | Ancona | F21V 21/406 362/396 |
| 2020/0229671 | A1* | 7/2020 | Cullins | A46B 15/0055 |
| 2024/0230074 | A1* | 7/2024 | Qiu | F21L 4/005 |

OTHER PUBLICATIONS

MA3TY. "Tactical Flashlight Rechargeable with Pressure Switch 1200 Lumens, Weapon Light with Offset Mount, High Power LED Zoomable Picatinny Rail Light, Black". https://www.amazon.com/Flashlight-1200Lumens-Waterproof-Rechargeable-Picatinny/dp/B07NV7DNQ1.

* cited by examiner

FLASHLIGHT GRIP

CROSS-REFERENCE TO RELATED APPLICATIONS

This application claims priority, under 35 U.S.C. § 119(e), to U.S. Provisional Patent Application No. 63/586,064, filed Sep. 28, 2023, and U.S. Provisional Patent Application No. 63/663,320, filed Jun. 24, 2024, the entire contents of each of which are fully incorporated herein by reference.

FIELD

The disclosed technology relates to flashlight grips and corresponding components and methods of manufacture, assembly, disassembly, repair, and use thereof. Specifically, this disclosed technology relates to a flashlight grip that may be used to increase firearm stability when using a flashlight in conjunction with a firearm.

BACKGROUND

Using firearms in low-light conditions can be difficult and hazardous. In many cases, when using a firearm in low-light conditions, such as night, firearm-users, such as law enforcement, must use one hand to hold a firearm while separately using the other hand to hold a flashlight, such as a tactical flashlight. This is not ideal for multiple reasons. First, it is more difficult to aim, shoot, and fire a firearm from a single hand, as a single-handed grip does not have the stability of a dual-handed grip. Second, it is more difficult to line up a flashlight with the aim of the firearm when they are in separate hands. As a result, the flashlight may not be illuminating the area upon which the user intends to fire.

Accordingly, there is a need for improved devices and methods for flashlight grips. Embodiments of the present disclosure are directed to this and other considerations.

SUMMARY

Disclosed embodiments may include devices and methods for a flashlight grip. The flashlight grip may include a handle. The handle may include a lower mount configured to hold a flashlight, one or more handle mounting bars disposed lengthwise along the lower mount, a handle partial ring, and a shaft coupled to the lower mount. The flashlight grip may include a top with an upper mount, a top partial ring, and one or more top mounting bars disposed lengthwise along the upper mount. The one or more top mounting bars and top partial ring may be complementary to the handle mounting bars and handle partial ring. The flashlight grip may further include one or more connectors extending through the top mounting bars and the handle mounting bars. The one or more connectors may be configured to secure a flashlight in between the handle and the top.

Disclosed embodiments may include devices and methods for a flashlight grip. The flashlight grip may include a handle. The handle may include a lower mount configured to hold a flashlight, the lower mount forming a lower cavity, one or more handle mounting points disposed lengthwise along the lower mount adjacent to the lower cavity, and a shaft coupled to the lower mount. The flashlight grip may include a top, which may include an upper mount, the upper mount forming an upper cavity, and one or more top mounting points disposed lengthwise along the upper mount adjacent to the upper cavity. The one or more top mounting points may be complementary to the one or more handle mounting points. The handle and top may be configured to secure a flashlight.

Disclosed embodiments may include devices and methods for a flashlight grip. The flashlight grip may include a handle. The handle may include a lower mount configured to hold a flashlight and a shaft. The flashlight grip may further include an upper portion complementary to the handle. The flashlight grip may also include a tightening mechanism configured to secure the upper portion around a flashlight to the handle.

Disclosed embodiments may include devices and methods for a flashlight grip. The flashlight grip may include a handle. The flashlight grip may also include a first mounting portion coupled to the handle. The flashlight grip may include a first mounting bar disposed lengthwise along the first mounting portion. Additionally, the flashlight grip may include a second mounting portion coupled to the handle. The flashlight grip may further include a second mounting bar disposed lengthwise along the second mounting portion. Furthermore, the second mounting portion may be positioned opposite the first mounting portion and the first mounting portion and second mounting portion may form a cavity. The flashlight grip may include one or more connectors extending through the first mounting bar and the second mounting bar. The one or more connectors may be configured to secure a flashlight in between the first mounting portion and the second mounting portion.

Disclosed embodiments may include devices and methods for a flashlight grip. The flashlight grip may include a handle with a channel. The flashlight grip may also include a first mounting portion coupled to the handle and a second mounting portion coupled to the handle. The second mounting portion may be positioned opposite the first mounting portion and the first mounting portion and second mounting portion may form a cavity. The flashlight grip may include a tightening mechanism configured to reduce a distance from the first mounting portion to the second mounting portion in order to secure a flashlight in between the first mounting portion and the second mounting portion. Furthermore, the flashlight grip may include a switch assist sliding within the channel and configured to engage a button of a flashlight.

Disclosed embodiments may include devices and methods for a flashlight grip. The flashlight grip may include a handle. The flashlight grip may also include a mount coupled to the handle comprising at least two portions, where the at least two portions form a cavity for receiving a flashlight. Additionally, the flashlight grip may include one or more connectors extending through the at least two portions. Furthermore, the flashlight grip may include one or more cam levers engaging the one or more connectors to tighten the at least two portions around the flashlight to secure the flashlight within the cavity of the mount.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
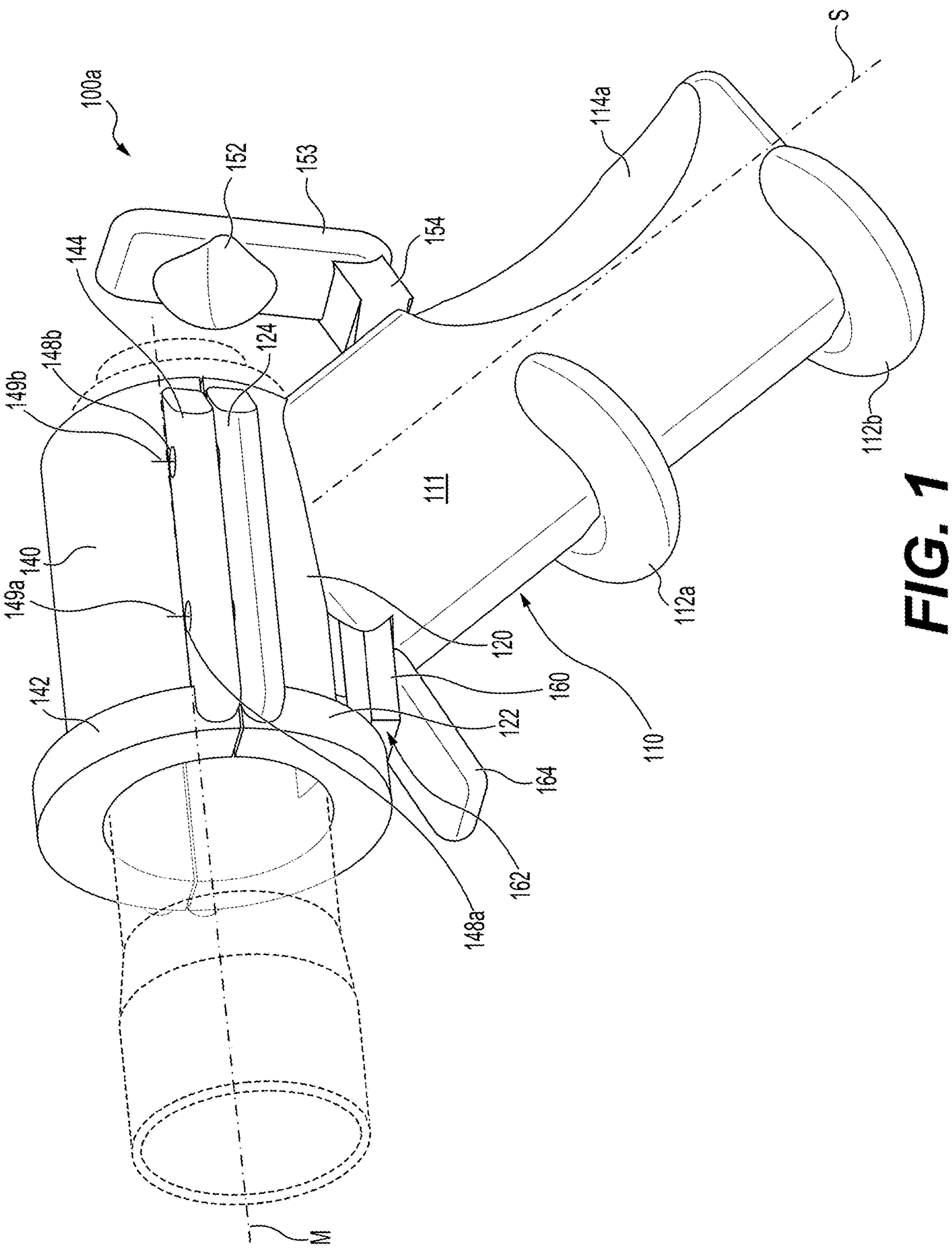
FIG. 1 is a perspective side view of a flashlight grip with a flashlight held within the device in accordance with certain embodiments of the disclosed technology.
Figure 2:
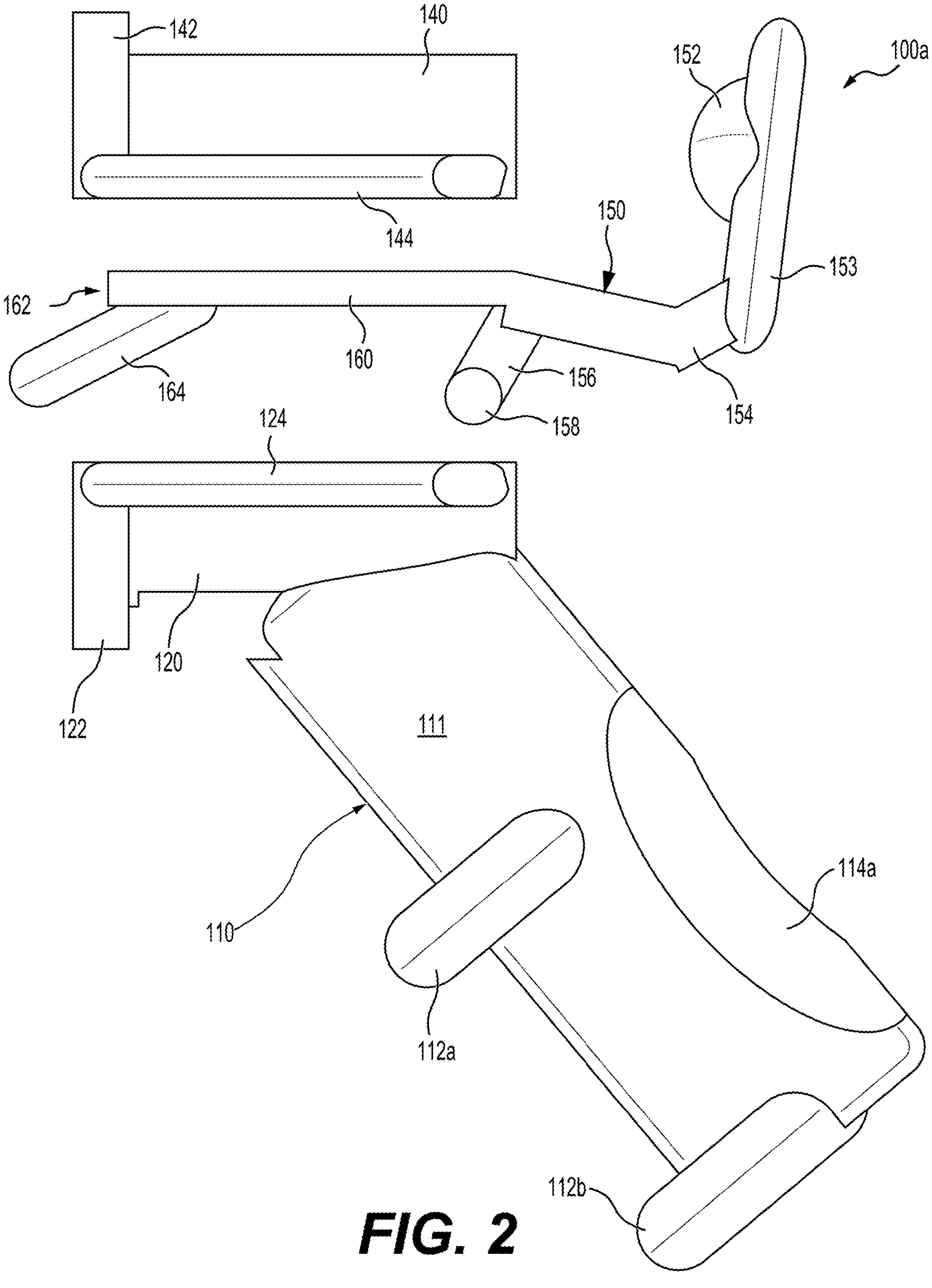
FIG. 2 is an exploded left side view of a flashlight grip with an assist lever and a safety stop in accordance with certain embodiments of the disclosed technology.
Figure 3:
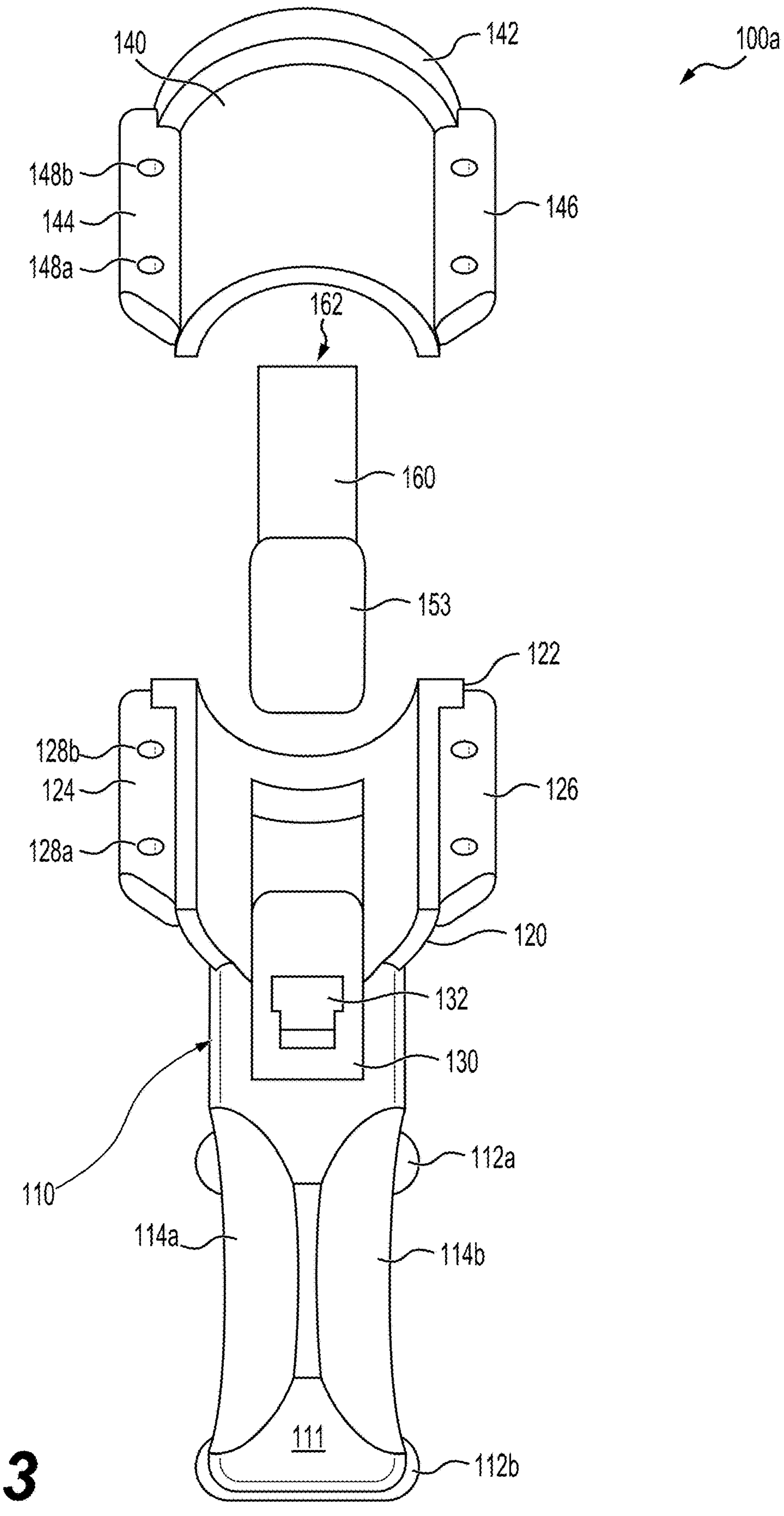
FIG. 3 is an exploded top back view of a flashlight grip with an assist lever and a safety stop in accordance with certain embodiments of the disclosed technology.

FIG. 1 is a perspective side view of an exemplary flashlight grip 100*a* used to hold a flashlight (shown in dotted lines) in accordance with some embodiments, which may be shown in further detail in FIGS. 2 and 3. The flashlight grip may generally include a handle 110 and a top 140 to surround the flashlight, connected by one or more connectors 149*a*, 149*b*. The handle 110 may include a shaft 111 and a lower mount 120. Lower mount 120 may be positioned longitudinally about axis M and shaft 111 may be positioned longitudinally about axis S. Axis M may line up with the longitudinal axis of the flashlight carried within flashlight grip 100*a*. Axis S may be a specific angle from axis M in order for the user to easily operate the flashlight within the flashlight grip (e.g., to maintain a two-handed grip). Axis S may be positioned at about a 40-degree angle from perpendicular to axis M. Alternatively, the axis S may be positioned at about a 35-degree angle to about a 45-degree angle, about a 30-degree angle to about a 50-degree angle, or about a 25-degree angle to about a 55-degree angle from perpendicular to axis M. Accordingly, the shaft 111 may be positioned at about a 40-degree angle from perpendicular to the lower mount 120. Alternatively, the shaft 111 may be positioned at about a 35-degree angle to about a 45-degree angle, about a 30-degree angle to about a 50-degree angle, or about a 25-degree angle to about a 55-degree angle from perpendicular the lower mount 120.

The shaft 111 portion of the handle 110 may include one or more grip points 112*a*, 112*b* to aid the user in maintaining a firm grasp of the handle 110. The one or more grip points 112*a*, 112*b* may be placed along the front side of the handle 110 and extend partially along the sides of the handle 110. The one or more grip points 112*a*, 112*b* may be semicircular in shape to fit the curvature of a hand of the user. The one or more grip points 112*a*, 112*b* may be spaced apart such that a user's fingers can tighten against grip points 112*a*, 112*b* for additional stability. The back of the shaft 111 may have one or more recesses or indentations 114*a*, 114*b*. The recesses 114*a*, 114*b* may be positioned on either side of the shaft 111 (left or right). The recesses 114*a*, 114*b* may be cutouts. The recesses 114*a*, 114*b* may be semispherical in shape. The recesses 114*a*, 114*b* may aid the user's hand in firmly gripping the handle 110. The recesses 114*a*, 114*b* allow the flashlight grip 100*a* to be used in either hand comfortably. The recesses 114*a*, 114*b* may allow the user's firing hand (e.g., a hand used to grip a gun) to more easily join with a non-firing hand (e.g., the hand used to grip the flashlight grip, for example, flashlight grip 100*a*) to create a better two-handed shooting grip.

The lower mount 120 of flashlight grip 100*a* may be configured to hold a flashlight (e.g., the bottom of a flashlight). The lower mount may be configured with a lower cavity formed therein in the general shape to receive a flashlight. The lower mount 120 may be appropriately sized so that a flashlight may rest in the lower mount 120 securely and may have a general inner structure in the form of a half-cylinder with the inside removed. The lower mount 120 may have a cut out 130 at the bottom of the lower mount 120 to accommodate a flashlight clip. The handle 110 may further include a handle partial ring 122 at the front of the lower mount 120. The handle partial ring 122 may be a half-cylindrical shape and may be thicker than the lower mount 120. The handle 110 may further include one or more handle mounting bars 124, 126. The handle mounting bars 124, 126 may be disposed lengthwise along the lower mount 120. The handle mounting bars 124, 126 may be positioned at the top of the semi-cylinder of both the lower mount 120 and the handle partial ring 122. The handle mounting bars 124, 126 may be flush with the top of the lower mount 120 and the handle partial ring 122. The handle mounting bars 124, 126 may extend outwardly from either side of the handle partial ring 122 and lower mount 120. The handle mounting bars 124, 126 may contain one or more holes 128*a*, 128*b* to receive connectors 149*a*, 149*b* to mount the top 140 to the handle 110.

The top 140 may be formed or include an upper mount which may have similar features and/or be complementary to the lower mount 120. The upper mount may be configured with an upper cavity formed therein in the general shape to receive a flashlight. The upper cavity may be positioned longitudinally about axis M. The top 140 may also include a top partial ring 142 which may have similar features and/or be complementary to the handle partial ring 122. The top 140 may also include one or more top mounting bars 144, 146 on either side of the top. The top mounting bars 144, 146 may be disposed lengthwise along the top 120. The bottom side of the top mounting bars 144, 146 may be flush with the bottom of the upper cavity and/or the top partial ring 142. The top mounting bars 144, 146 may contain one or more holes 148*a*, 148*b* to receive connectors 149*a*, 149*b* to mount the top 140 to the handle 110. The top mounting bars may have similar features and/or be complementary to the handle mounting bars 124, 126. The holes 148*a*, 148*b* in the top mounting bars may be complementary to the holes 128*a*, 128*b* in the handle mounting bars 124, 126.

One or more connectors 149*a*, 149*b* may be used to secure the top 140 to the handle 110. The one or more connectors 149*a*, 149*b* may be inserted into the one or more holes 148*a*, 148*b* in the top mounting bars 144, 146 and may extend through the top mounting bars 144, 146 and the holes 128*a*, 128*b* in the handle mounting bars 124, 126. The one or more connectors 149*a*, 149*b* may be used to tighten the top 140 to the handle 110 around the flashlight, thereby securing the flashlight in place inside the flashlight grip 100*a*. The one or more connectors 149*a*, 149*b* may be bolts, studs, screws, nuts, and/or other similar mechanical devices (e.g., cam levers, as shown with reference to FIG. 5). In some embodiments, the one or more holes 148*a*, 148*b* in either the top mounting bars 144, 146 or the handle mounting bars 124, 126 may be threaded. Therefore, a bolt may be used from the opposing side (e.g., if the handle mounting bar holes 128*a*, 128*b* are threaded, the bolt may be inserted from into the top mounting bar holes 148*a*, 148*b*, or if the top mounting bar holes 148*a*, 148*b* are threaded, the bolt may be inserted into the handle mounting bar holes 128*a*, 128*b*) to tighten the top 140 to the handle 110. In some embodiments, a nut may be used in conjunction with a bolt to tighten the top 140 to the handle 110. A nut may also be used in conjunction with a stud and a threaded hole (e.g., where the stud is threaded into the threaded hole of the top mounting bars 144, 146 and extends through an opposing unthreaded hole of the handle mounting bars 124, 126 and a nut may be used to tighten the handle mounting bars 124, 126 to the top mounting bars 144, 146 or vice versa).

The flashlight grip 100*a* may include one or more optional features, such as a switch assist 150, and/or a safety stop 160, which are described more thoroughly with reference to FIGS. 2 and 3.

FIG. 2 is an exploded left side view of a flashlight grip 100*a* with an optional switch assist 150 and a safety stop 160. FIG. 3 is an exploded top-back view of the same flashlight grip 100*a* with the optional switch assist 150 and safety stop 160. By translating and/or rotating toward the front of the flashlight grip 100*a*, the switch assist 150 may be used to assist the user in turning on or off the flashlight. The switch assist 150 may include a button contactor 152 attached to an upwardly extending member 153, which is attached to the switch assist body 154. The center of button contactor 152 may be configured to align with axis M. The switch assist body 154 may have a downwardly extending member 156. The downwardly extending member 156 may include an interlocking pivot piece 158. The pivot piece 158 may be a horizontal cylinder wider than the downwardly extending member 156. The interlocking pivot piece 158 may fit within a corresponding cavity 132. The cavity 132 may be a 'T-shape' (when viewing from the top) so that the wider interlocking pivot piece 158 can slot down in the front/lower part of cavity 132 and then slide backwards to interlock the switch assist 150 to the handle 110 but allow the switch assist to rotate and/or move forward and back at the pivot piece 158. In some embodiments, the cavity 132 may also be a mirrored 'L' shape, so that interlocking pivot piece 158 can slot backwards and then upwards within cavity 132. In operation, the hand of the user (e.g., the purlicue, or the skin in between index finger and thumb, or the user's thumb) may press on the back of the upwardly extending member 153, which may then rotate the switch assist 150 forward, and then the button contactor 152 may contact the button on the rear of the flashlight to activate the flashlight. In some embodiments, the switch assist 150 may slide forward and rearward in addition to (or instead of) rotating to contact the flashlight.

The flashlight grip 100*a* may also include a safety stop 160 to prevent an accidental activation of the flashlight. The safety stop 160 may be connected to the switch assist 150. Alternatively, the safety stop 160 may be of integral construction with the switch assist 150. The safety stop 160 may be joined to the switch assist at a midpoint. The safety stop 160 may include an end stop 162 and a lever 164. The end stop 162 may contact handle partial ring 122. The handle partial ring 122 may prevent the rotational or translational movement of switch assist 150 and/or the safety stop 160. The end stop 162 contacting the handle partial ring 122 may prevent the switch assist 150 from being able to move or rotate forward (e.g., furthermore, preventing the button contactor 152 from contacting the power button of the flashlight).

To allow the switch assist 150 to operate with the safety stop 160, the user may apply downward pressure to lever 164 with a finger. This may cause the safety stop 160 to bend (either at the midpoint or throughout the horizontal member). Applying downward pressure in this manner to the lever 164 may allow the end stop 162 to be held below the handle partial ring 122, thereby allowing the switch assist 150 to move forward and/or rotate. This may allow the button contactor 152 to contact the power button of the flashlight. In some embodiments, the end stop 162 may also extend forward to be below the handle partial ring 122, which may allow the safety stop 160 to be temporarily disabled and allow free movement of the switch assist 150 without the user interacting with the lever 164 of the safety stop 160. The user may apply rearward pressure to the lever 164 to reengage the safety stop 160 by allowing the end stop 162 to return to its starting position so that it may contact the handle partial ring 122.

In some embodiments, alternative means may be used to provide switch assist or safety stop functionality to the flashlight grip. For example, in some embodiments, the safety stop 160 and/or the switch assist 150 may utilize magnets. The magnets may be used to predispose the safety stop 160 and/or switch assist 150 to favor a first position (e.g., where the flashlight button is not pressed, or a locked-out position) over a second position (e.g., where the flashlight button is pressed, or a free-moving position). Magnets may be disposed on or embedded in lower mount 120 or other parts of handle 110, such as shaft 111, as well as the safety stop 160 or the switch assist 150.

In some embodiments, the safety stop 160 may be a switch positioned lengthwise along the front of shaft 111 and may be separate from switch assist 150. The safety stop 160 may have two positions: a first, lower position, where the switch assist 150 may be able to move forward toward handle partial ring 122, and a second, upper position, where the safety stop 160 is positioned up against the bottom of lower mount 120 and/or between the handle partial ring 122 and the shaft 111. In the second, upper position, the safety stop 160 may prevent the forward travel of a front end of the switch assist 150, thereby preventing the switch assist 150 from contacting the button of the flashlight. The user may be able to change the safety stop 160 from the first position to the second using their fingers positioned on the front of the flashlight grip. In some embodiments, the safety stop 160 may include either a magnet or complementary notch to secure the safety stop 160 in one of the two positions. In some embodiments, the safety stop 160 may be in front of shaft 111 or of integral construction with shaft 111.

In some embodiments, a first magnet may be embedded in the bottom of lower mount 120 or shaft 111. The safety stop 160 may include a corresponding second magnet with an opposite polarity facing toward the first magnet of the lower mount 120. In an embodiment, the second magnet of safety stop 160 is attracted via magnetic forces to the first magnet of lower mount 120. Therefore, the magnet of safety stop 160 may favor a position that prevents the switch assist 150 from contacting the button of the flashlight. The user may push down on safety stop 160 to overcome the magnetic forces and allow the switch assist 150 to move forward and contact the button of the flashlight. When the user releases the safety stop 160, the safety stop 160 may return to the upper position that prevents the switch assist 150 from contacting the button on the flashlight.

Figure 4:
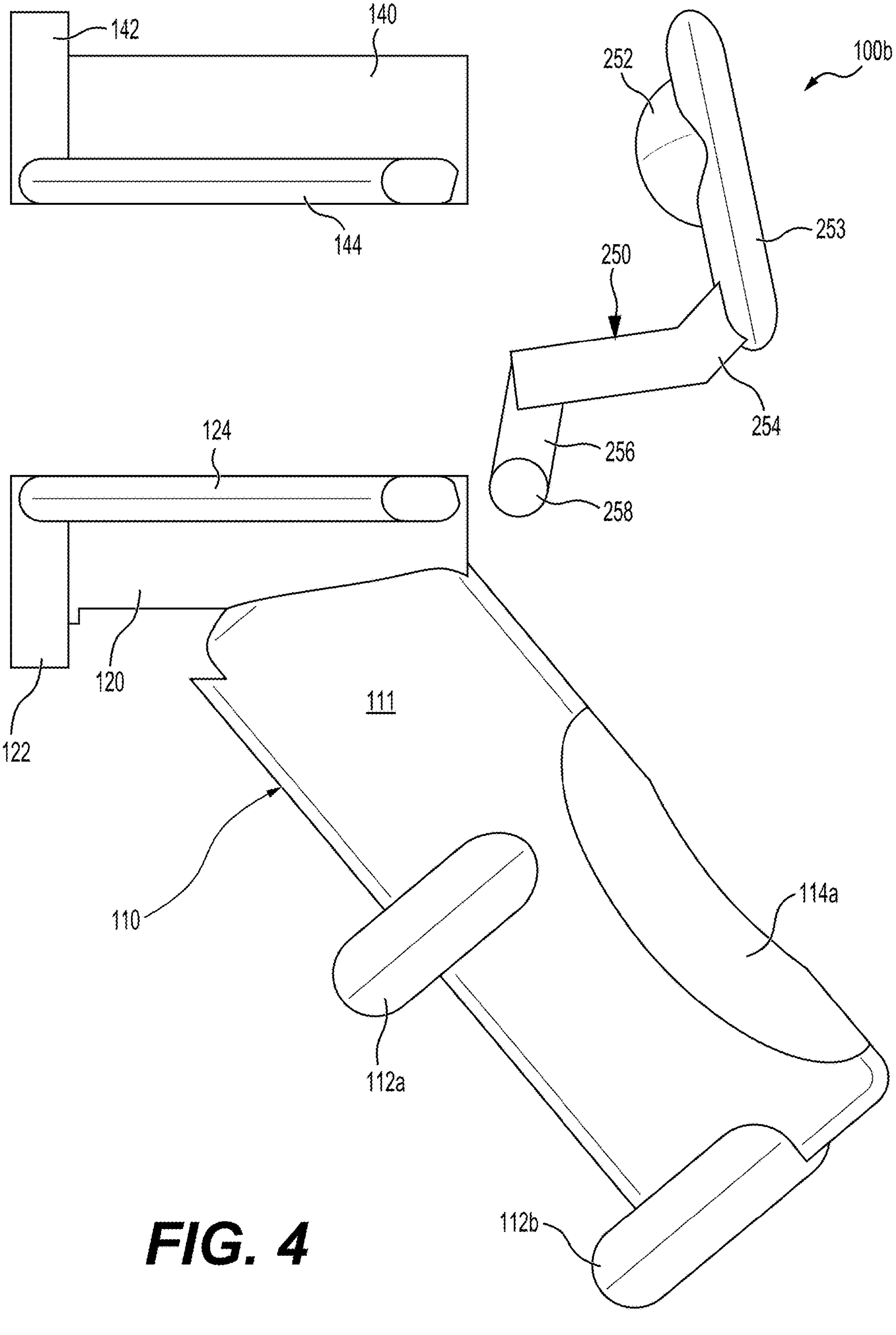
FIG. 4 is an exploded left side view of a flashlight grip with an assist lever in accordance with certain embodiments of the disclosed technology.

FIG. 4 is an exploded left side view of a flashlight grip **100*b* with an optional switch assist 250. Flashlight grip 100*b* may lack a safety stop, such as safety stop 160. Flashlight grip 100*b* may include a switch assist 250. Switch assist 250 may lack a connection to a safety stop. The switch assist 250 may be otherwise similar to switch assist 150. Switch assist 250 may interlock with a cavity similar to cavity 132, which may allow switch assist 250 to rotate or move between an open position (e.g., where the button contactor 252 does not contact the on switch of the flashlight) and a closed position (e.g., where the button contactor 252** contacts the on switch of the flashlight to turn the flashlight on).

Figure 5:
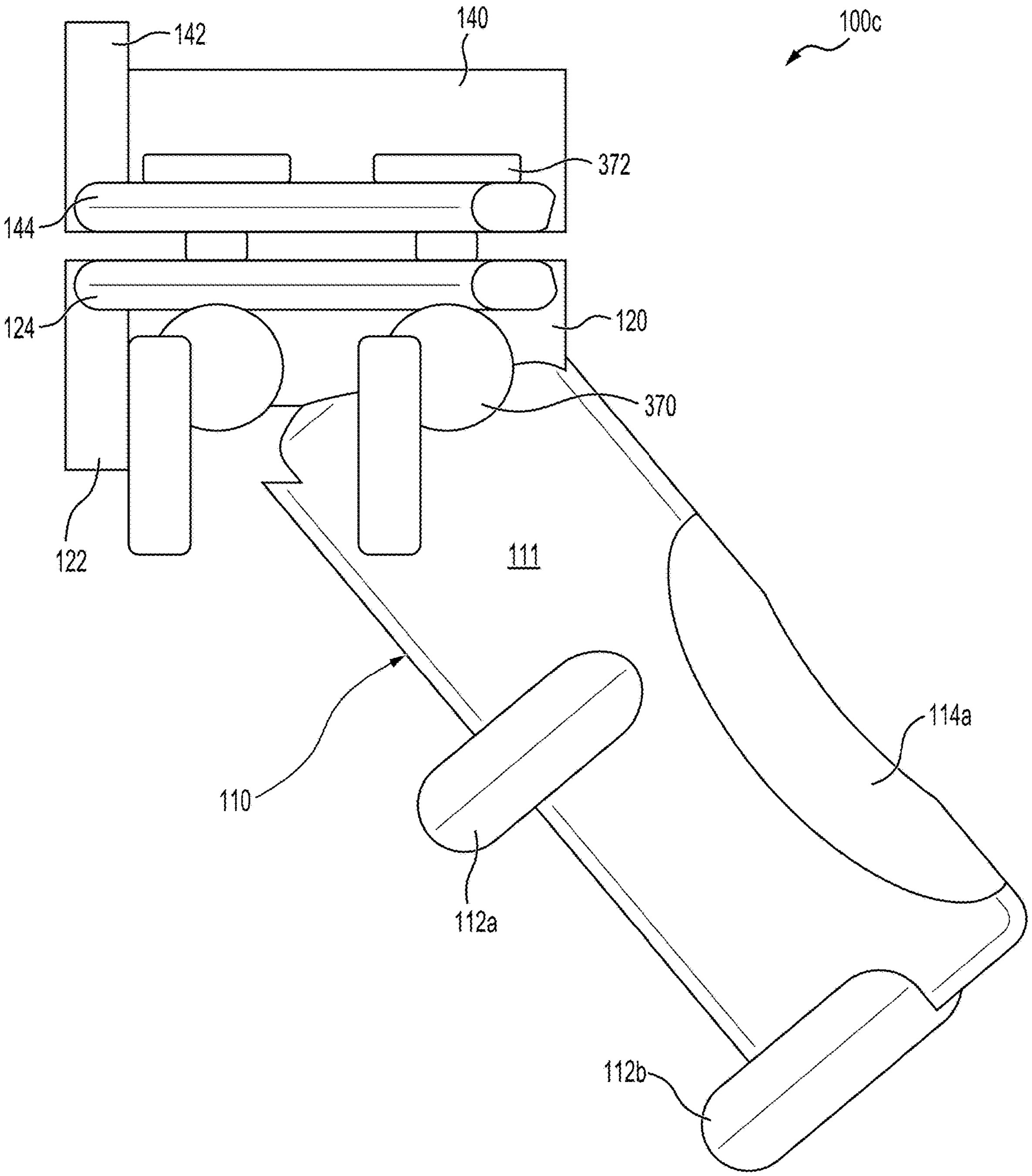
FIG. 5 is a left side view of a partially assembled flashlight grip with cam levers in accordance with certain embodiments of the disclosed technology.

FIG. 5 is a partially exploded left side view of a flashlight grip **100*c* with cam levers 370. Flashlight grip 100*c* may include or may lack a switch assist or safety stop. FIG. 5 shows top 140 partially attached to handle 110. The top 140 may be in an 'open' position, where a flashlight may be received in the space between the top 140 and the handle 110. After a flashlight is inserted, the top 140 may be tightened to a 'closed' position around the flashlight, which secures the flashlight in between the top 140 and the handle 110. In some embodiments, such as the flashlight grip 100*c* displayed in FIG. 5, tightening may be performed by one or more cam levers 370. The cam lever 370 may also refer to a cam clamp. The cam levers 370 may be positioned at each of the aligned holes 128*a*, 128*b* of the handle mounting bars 124, 126 of the handle 110 and top mounting bars 144, 146 of the top 140. The cam levers 370 may be used to tighten top 140 against handle 110 using a threaded member 372, such as a bolt or stud. The cam levers 370 may be positioned at the top 140 with the threaded member 372 extending up from the handle mounting bars 124. Alternatively, the cam levers 370 may be positioned at the bottom under handle mounting bars 124 and the threaded member 372 may extend downward from the top mounting bars 144. In operation, to tighten the top 140 around the flashlight to the handle 140, the cam lever 370 may be rotated on the threaded member 372 until tight, then the lever of cam lever 370** may be pushed down into place.

In some embodiments, the top 140 may be hinged to one side (e.g., such that the mounting bars of the top and the handle of one side are connected by one or more hinges). The mounting bars on the remaining side of the flashlight grip may be connected using bolts, screws, nuts, studs, threaded members, or cam levers.

In some embodiments, the parts of the flashlight grip, such as the handle and the top, may be made of plastic (e.g., poly-vinyl acetate (PLA), polyethylenes, poly-vinyl chloride (PVC), acrylonitrile butadiene styrene (ABS), polycarbonate (PC), and/or polypropylene (PP)). In some embodiments, the flashlight grip may be made of flexible materials so that the flashlight grip may conform to the hand of the user. In some embodiments, the flashlight grip may be made partially or completely of metal (e.g., aluminum or steel). In some embodiments, the flashlight grip may include a material to aid in the user gripping the handle.

In some embodiments, the handle of the flashlight grip may be foldable. For example, with reference to FIG. 1, the flashlight grip may include a hinge in the handle 110 between the lower mount 120 and the shaft 111 of handle 110. The shaft 111 of handle 110 may be folded either forwards or backwards compared to the lower mount 120 to reduce the overall size of the flashlight grip.

In some embodiments, the handle or shaft 111 may be sized to fit in the pocket of a user or a holster.

The flashlight grip may be used with a variety of different flashlights of different shapes and sizes. The flashlight grip may be used with a tactical flashlight. The flashlight grip may be configured to be used with flashlights with an exterior case about 1 inch (or 25.4 mm) in diameter. The flashlight grip may be configured to be used with flashlights smaller or larger than 1 inch (or 25.4 mm) in diameter. To accommodate smaller flashlights, the flashlight grip may incorporate bushings that fit around the body of a flashlight and may be compressed between the lower mount 120 and the top 140.

Figure 6:
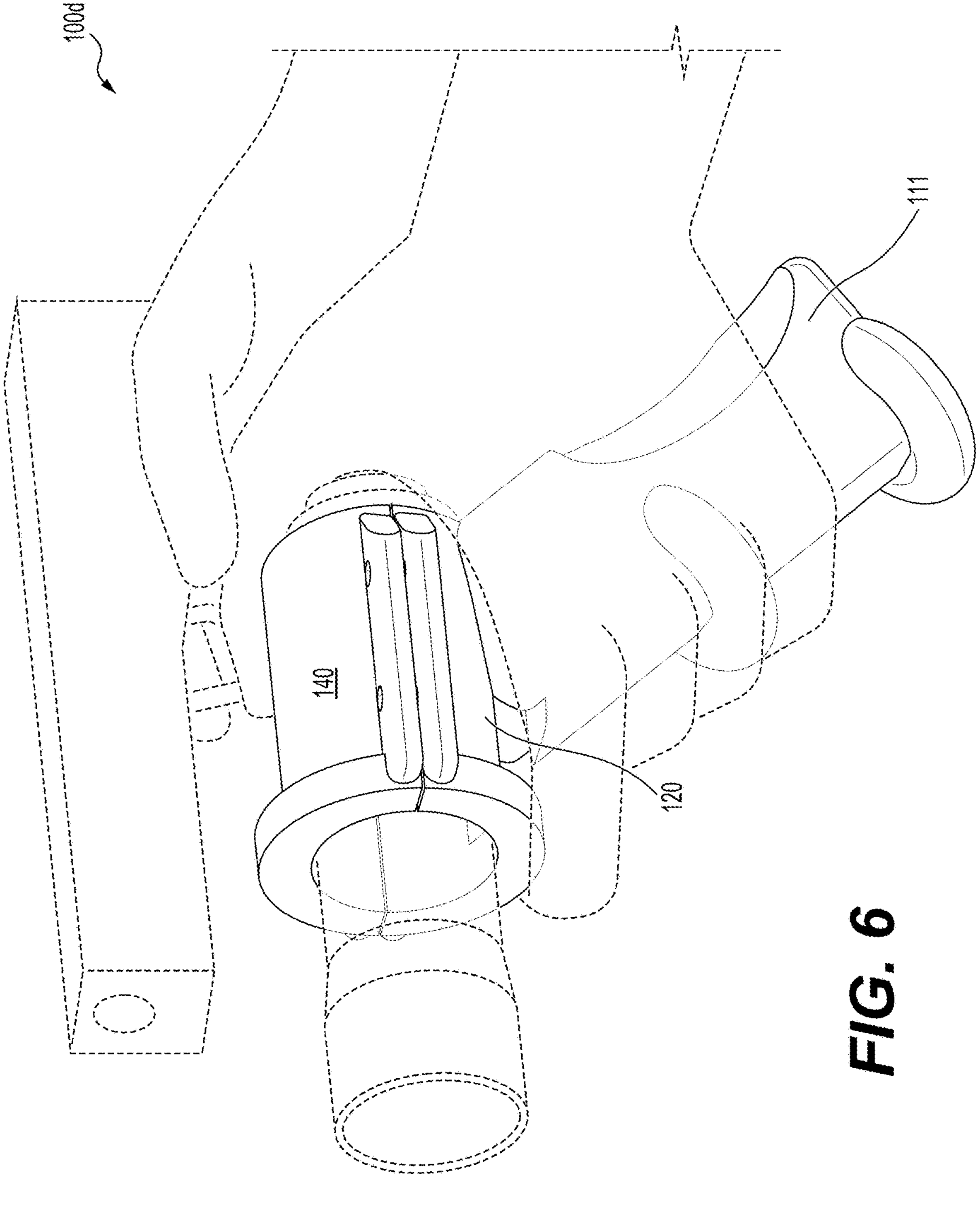
FIG. 6 is a perspective side view of a flashlight grip and flashlight in use with a firearm demonstrating a representative two-handed grip in accordance with certain embodiments of the disclosed technology.

FIG. 6 is a perspective side view of a flashlight grip **100*d* and a flashlight in use with a firearm. The flashlight grip 100*d* may include a shaft 111, a lower mount 120, and a top 140, and may include or may lack a switch assist or safety stop. Any of flashlight grips 100*a*, 100*b*, 100*c*, 300, or 500 may be used as shown in FIG. 6. In FIG. 6, flashlight grip 100*d*** is in the user's left hand and surrounds a flashlight, while a firearm is in the user's right hand. The user's hands are pressed against each other with the barrel of the firearm positioned directly next to the bulb and reflector of the flashlight. The barrel of the firearm may be in parallel with the beam of the flashlight. The user may operate the flashlight by pressing the button on the rear of the flashlight with his/her left hand (e.g., using the purlicue of the left hand) while maintaining the alignment of the flashlight with the barrel of the firearm and maintaining the two-handed grip on the firearm. By maintaining the two-handed grip on the firearm, the accuracy of shots fired by the user significantly increases. Furthermore, by aligning the beam of the flashlight with the barrel of the firearm, the user is more easily able to illuminate his/her target in the same direction as the firearm, further increasing accuracy of shots fired. In other embodiments, the firearm may be placed in the user's left hand and the flashlight grip may be used in the user's right hand.

Additionally, using the flashlight grip in this way enhances the user's control of the flashlight beam, as the user does not have to directly hold the flashlight and does not have to use his/her thumb to operate the button of the flashlight. By placing their hand on the grip, the user may maintain better control of the firearm. Furthermore, the user may use the handle partial ring and the top partial ring to further apply pressure to the flashlight button if needed (e.g., by positioning the user's fingers against the top partial ring or handle partial ring).

In an alternative embodiment, the disclosed flashlight grip may also be used in conjunction with a shoulder-fired firearm (e.g., a rifle, shotgun). In that case, the user may be able to similarly position the flashlight grip next to the forestock of the shoulder-fired firearm to align the flashlight beam with the barrel of the shoulder-fired firearm.

In some embodiments, the flashlight grip may be used in a self-defense capacity. The user may use the light to illuminate a low light environment. If the user became involved in an altercation, he/she may use the flashlight grip to strike the attacker.

In some embodiments, the flashlight grip may be used to break glass. A glass breaker tip (e.g., tungsten carbide glass breaker tip) may be incorporated into the grip (e.g., below a lower grip point 112*b* on shaft 111). This may allow a user, such as a law enforcement officer, to gain access to automobiles and structures quickly.

In some embodiments, a flashlight may be integrated into the flashlight grip. A combined flashlight and flashlight grip may have the advantages of both a flashlight with also those of a flashlight grip as described above with reference to FIG. 6.

Figure 7:
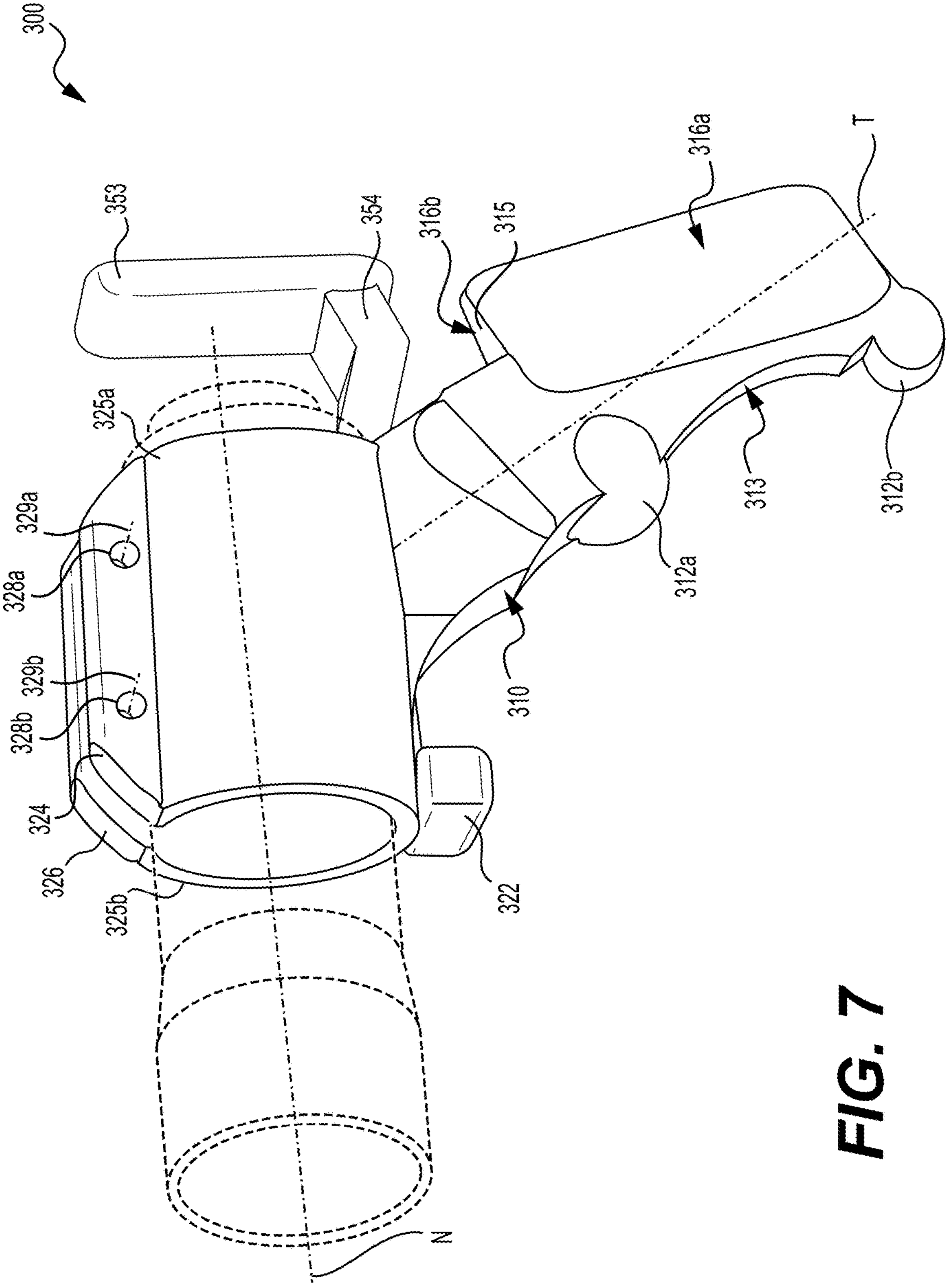
FIG. 7 is a perspective side view of a flashlight grip with a multi-purpose assist lever with a flashlight held within the device in accordance with certain embodiments of the disclosed technology.
Figure 8:
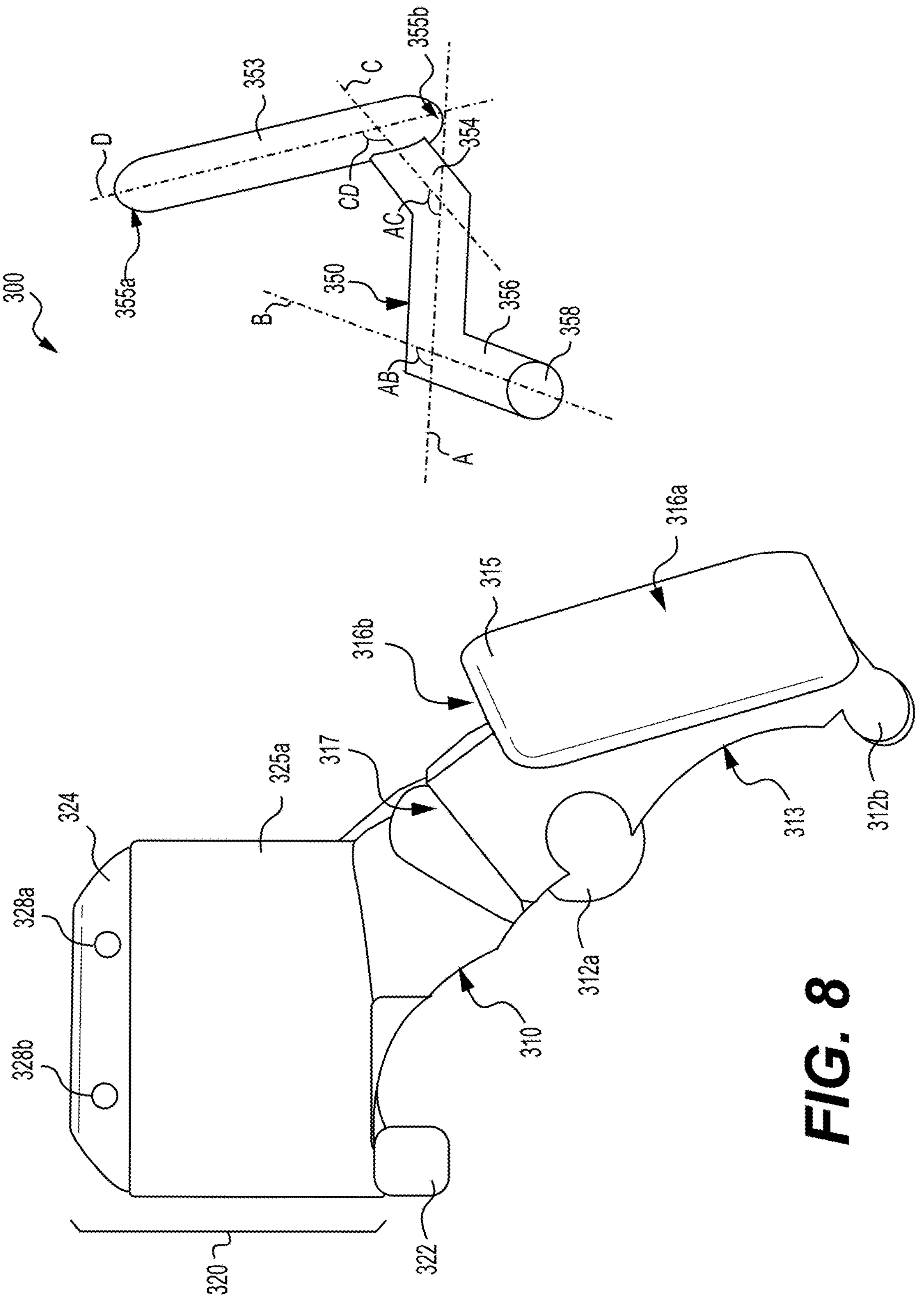
FIG. 8 is an exploded left side view of a flashlight grip with a multi-purpose assist lever in accordance with certain embodiments of the disclosed technology.
Figure 9:
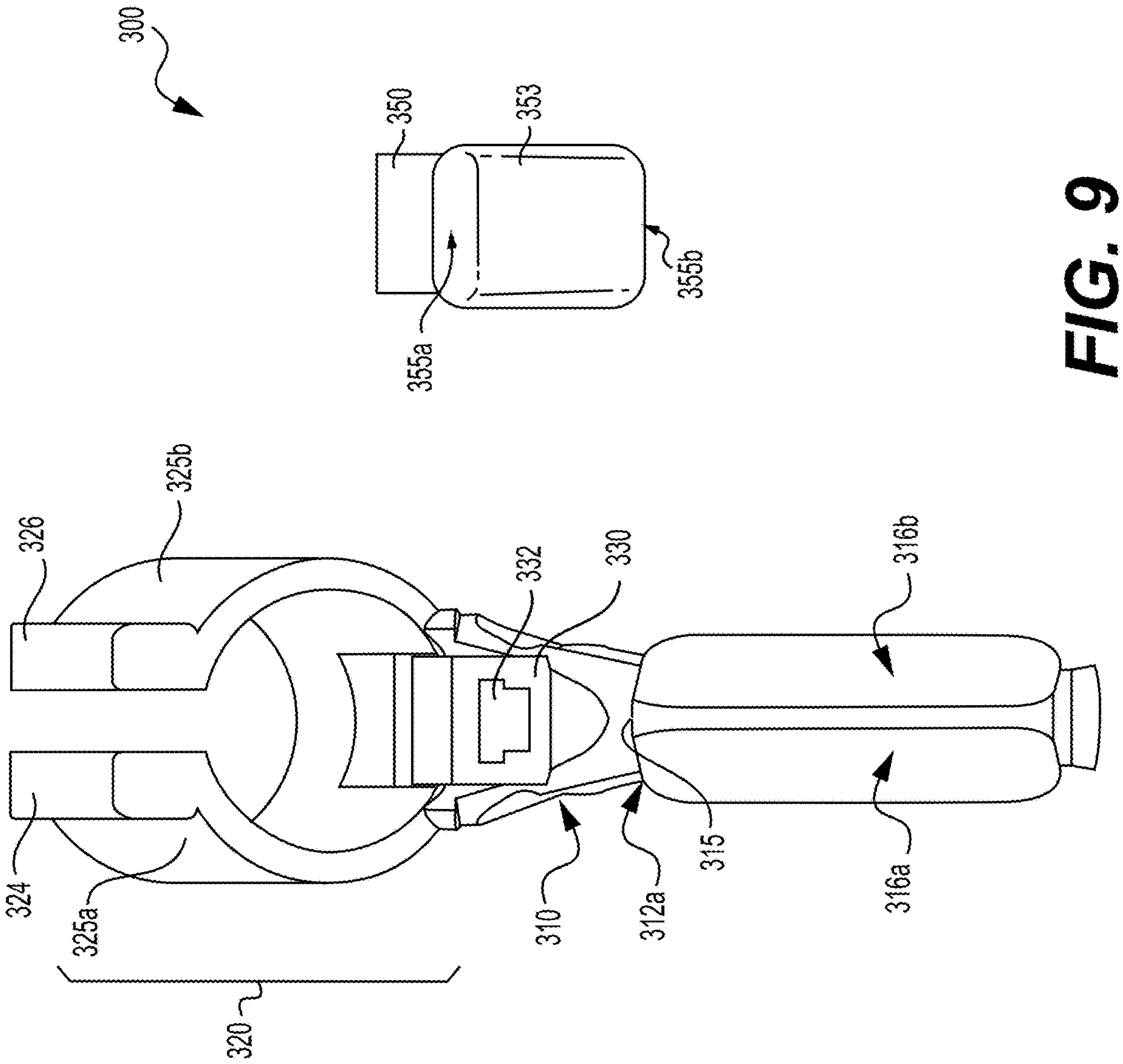
FIG. 9 is an exploded top back view of a flashlight grip with a multi-purpose assist lever in accordance with certain embodiments of the disclosed technology.

FIG. 7 is a perspective side view of an exemplary flashlight grip 300 used to hold a flashlight (shown in dotted lines) in accordance with some embodiments, which may be shown in further detail in FIGS. 8 and 9. Flashlight grip 300 may include a handle 310 with an integrated mount 320 (FIG. 8). The flashlight and the mount 320 may be positioned longitudinally about axis N. Handle 310 may be positioned longitudinally about axis T. Axis N may line up with the longitudinal axis of the flashlight carried within flashlight grip 300. Axis T may be positioned at a specific angle from axis N in order for the user to easily operate the flashlight within the flashlight grip (e.g., to maintain a two-handed grip). For example, axis T may be positioned at about a 40-degree angle from perpendicular to axis N. Alternatively, the axis T may be positioned at about a 35-degree angle to about a 45-degree angle, about a 30-degree angle to about a 50-degree angle, or about a 25-degree angle to about a 55-degree angle from perpendicular to axis N. Accordingly, handle 310 may be positioned at about a 40-degree angle from perpendicular to the mount 320. Alternatively, handle 310 may be positioned at about a 35-degree angle to about a 45-degree angle, about a 30-degree angle to about a 50-degree angle, or about a 25-degree angle to about a 55-degree angle from perpendicular to the mount 320.

The handle 310 may include one or more grip points 312*a*, 312*b* to aid the user in maintaining a firm grasp of the handle 310. The one or more grip points 312*a*, 312*b* may be placed along the front side of the handle 310 and extend partially along the sides of the handle 310. The one or more grip points 312*a*, 312*b* may be semicircular, spherical, or cylindrical in shape to fit the curvature of a hand of the user, and to aid the user in maintaining a two-handed grip. The one or more grip points 312*a*, 312*b* may be spaced apart such that a user's fingers can tighten against grip points 312*a*, 312*b* for additional stability while maintaining a two-handed grip. The handle 310 may include one or more recesses 313 on the front side. The lowest of one or more grip points 312*b* may be positioned underneath a user's smallest finger to aid in pressing the fingers together while holding handle 310. The one or more recesses 313 may be semicircular and may aid the user in placing their fingers for an advantageous grip. The one or more recesses 313 may make the handle 310 more ergonomic. The one or more recesses 313 may be aligned with the placement of one or more fingers of the user on the handle 310. Handle 310 may include one or more ergonomic features 317 to make handle 310 more comfortable to hold or to aid the user in gripping the handle. Handle 310 may generally be thinner than handle 110 of flashlight grip 100*a*.

The handle 310 may include a wedge 315. Wedge 315 may extend rearwardly from handle 310. Wedge 315 may include a first surface 316*a* and a second surface 316*b*. The first surface 316*a* may be positioned on a left side of the wedge and the second surface 316*b* may be positioned on a right side of the wedge. The wedge 315 and first and second surfaces 316*a*, 316*b* may aid in aligning flashlight grip 300 with a firearm for a two-handed grip. For example, if a user was shooting with the firearm in their right hand, the user may position the palm of their left hand against the first surface 316*a* of wedge 315 and grip the front of handle 310 with the metacarpals or phalanges of the fingers of their left hand. Furthermore, the user may position the backside of the phalanges of the right hand against the second surface 316*b* of wedge 315 while holding the firearm. Alternatively, if a user was using their left hand to hold the firearm, flashlight grip 300 may be reversible such that a user may position the palm of their right hand against the second surface 316*b* of wedge 315 and grip the front of the handle 310 with the metacarpals or phalanges of the fingers of their right hand. Furthermore, the user may position the backside of the phalanges of the left hand against the first surface 316*a* of wedge 315 while holding the firearm. By positioning wedge 315 on handle 310 in this way, the flashlight grip 300 may naturally setup and align the flashlight with the barrel of the firearm.

Mount 320 may be of integral construction with handle 310. The mount 320 may be configured in a general shape to receive a flashlight. Mount 320 may be made of two portions, 325*a*, 325*b*, which may be two halves. Left side of mount 325*a* may be a mirror image of the right side of mount 325*b*. Together the two portions 325*a*, 325*b* of mount 320 may form a generally cylindrical shape, with a generally cylindrical cavity. The cavity may be configured for receiving a flashlight, as particularly shown in FIG. 7. The flashlight may have an exterior case of about 1 inch (or 25.4 mm) in diameter. The two portions 325*a*, 325*b* may have a wall dimension (e.g., between the outer side of the cylinder and the inner side of the cavity) that is approximately even throughout. Left side of mount 325*a* may include a left mounting bar 324 with one or more holes 328*a*, 328*b*. The one or more holes 328*a*, 328*b* may be threaded. The one or more holes may be configured to receive connectors 329*a*, 329*b*. The one or more connectors may be threaded (e.g., a bolt, stud, nut). Right side of mount 320 may include a right mounting bar 326 which may be similar or complementary to left mounting bar 324. Right mounting bar 326 may include one or more holes for receiving one or more connectors. The holes 328*a*, 328*b* in the left mounting bar 324 may align with the holes of right mounting bar 326 to allow the one or more connectors 329*a*, 329*b* to extend between the left mounting bar 324 and the right mounting bar 326. There may be a gap in between mounting bars 324, 326 and/or the two portions 325*a*, 325*b* of mount 320. By using the one or more connectors 329*a*, 329*b* to tighten against the mounting bars 324, 326, the two portions 325*a*, 325*b* of mount 320 may move closer together, narrowing the gap between the mounting bars. This further allows the two portions 325*a*, 325*b* of mount 320 to tighten around the flashlight and restrict the flashlight from moving within the mount 320. The gap may be configured to be sufficient in size such that one or more connectors 329*a*, 329*b* (e.g., a bolt or screw) and/or the two portions 325*a*, 325*b* of mount 320 have sufficient travel to alternate between a loose position (e.g., wherein mount 320 is loose around the flashlight, and a flashlight may be inserted or repositioned) and a tightened position (e.g., wherein mount 320 firmly surrounds the flashlight and prevents the flashlight from moving). The gap may be determined by thickness or flexibility of the material of mount 320 and/or the mounting bars 324, 326. Mount 320 may include an end stop to block the flashlight from extending beyond a specified point.

Mounting bars 324, 326 may be advantageously placed at the top of mount 320. By placing the mounting bars 324, 326 at the top of mount 320, the mounting bars 324, 326 minimize the lateral space needed between the flashlight grip 300 and the firearm. This may aid with alignment of the flashlight beam and the firearm barrel. Furthermore, a variety of connectors 329*a*, 329*b* may be used to secure the flashlight in mount 320. For example, in some embodiments, the holes (e.g., holes 328*a*, 328*b*) of both mounting bars may be unthreaded and the connectors may be bolts extending through the holes of both mounting bars secured by a nut on the exterior side of a mounting bar. In another example, studs may be used with nuts on the exterior side of the mounting bars. Furthermore, the holes (e.g., holes 328*a*, 328*b*) on one mounting bar may be threaded, while the holes on the other mounting bar may be unthreaded, allowing a bolt to extend through the unthreaded hole of the mounting bar of one side and thread into the threaded hole of the mounting bar of the other side. The bolt may be tightened against an outside edge of the mounting bar. In some embodiments, connectors (e.g., connectors 329*a*, 329*b*) may be cam levers. In some embodiments, mount 320 may be configured to tighten around or connect to a specific part of the flashlight. For example, mount 320 may be configured to surround a battery cap.

Mount 320 may further include a gripping aid 322. Gripping aid 322 may extend below the body of mount 320. The gripping aid may be generally a rectangular prism shape. The gripping aid 322 may allow a user to place the index finger of their hand used to grip handle 310 in front of gripping aid 322 for additional support. By placing their index finger against a front of gripping aid 322, the gripping aid 322 may provide the user with an additional grip point from which to more easily move switch assist 350 (FIG. 9) or activate the light by contacting the button with their thumb or purlicue. In some embodiments, the gripping aid 322 may also provide a resting position for the user to place their index finger when not moving switch assist 350 (FIG. 9). For example, the user may rest the index finger of the hand holding handle 310 against a back side of the gripping aid 322 and in front of handle 310.

In some embodiments, mounting bars 324, 326 and gripping aid 322 may help a user with handling flashlight grip 300 when reloading a firearm or correcting a firearm malfunction. For example, when reloading a firearm or correcting a firearm malfunction, the user may use their non-firing hand (e.g., the hand holding flashlight grip 300) to manipulate the firearm. In order to manipulate the firearm while holding the flashlight grip 300, the user may rotate the flashlight (within flashlight grip 300) in between their index and middle fingers of their non-firing hand. The user may press the middle or rear portions of their index and middle fingers against front surface of mounting bars 324, 326 and the front surface of gripping aid 322. By using mounting bars 324, 326 and gripping aid 322 in this way, the user may be able use the end of their index finger and thumb of their non-firing hand to manipulate the firearm as needed (e.g., to grip the slide, magazine, or bolt of the firearm), while still holding the flashlight grip 300. Once the user has completed manipulating the firearm as needed, the user may return to the two-handed grip. These elements of the flashlight grip 300 allow the user to quickly manipulate the firearm properly and avoid having to put down the flashlight grip 300 to manipulate the firearm. In some embodiments, mounting bars 324, 326 and gripping aid 322 may also allow the user to firmly grip the flashlight grip 300 (e.g., by pressing their index finger and middle fingers against the mounting bars 324, 326 and gripping aid 322 and pushing forward against wedge 315 with the palm of the hand) in order to use flashlight grip 300 defensively in a tactical situation (e.g., to strike an attacker or the surface of an object).

FIG. 8 is an exploded left side view of a flashlight grip 300 with a multi-purpose switch assist 350. FIG. 9 is an exploded top back view of the same flashlight grip 300 with the multi-purpose switch assist 350. The multi-purpose switch assist 350 may include a number of different components. In some embodiments, the multi-purpose switch assist 350 may be optional. The switch assist 350 may include a switch assist body 354, which may have two portions. The front portion of switch assist body 354 may be aligned longitudinally with axis A. The rear portion of switch assist body 354 may be aligned longitudinally with axis C. Furthermore, the switch assist 350 may include an upwardly extending member 353 with a top end 355*a* and a bottom end 355*b*. The upwardly extending member 353 may be connected to an end of switch assist body 354. The upwardly extending member 353 may be used to contact a power button of a flashlight to operate the flashlight (e.g., turn the flashlight on or off). The upwardly extending member 353 may be aligned longitudinally with axis D. The upwardly extending member 353 may or may not have a specific portion for contacting the button of the flashlight (e.g., similar to button contactor 152). The switch assist 350 may further include a downwardly extending member 356. The downwardly extending member 356 may be aligned longitudinally with axis B. The downwardly extending member 356 may be connected at one end to switch assist body 354. The downwardly extending member 356 may include an interlocking pivot piece 358.

In some embodiments, the axes may be aligned with the different portions of switch assist 350, upwardly extending member 353, and/or downwardly extending member 356 at specific angles. For example, there may be about a 103-degree angle between axis A and axis B (angle AB), there may be about a 125-degree angle between axis A and axis C (angle AC), and there may be about a 110-degree angle between axis C and axis D (angle CD). In some embodiments, angle AB may range from 100-degrees to 105-degrees, 95-degrees to 110-degrees, and 85-degrees to 120-degrees. In some embodiments, angle AC may range from 122-degrees to 128-degrees, 120-degrees to 130-degrees, and 110-degrees to 140-degrees. In some embodiments, angle CD may range from 107-degrees to 113-degrees, 105-degrees to 115-degrees, 100-degrees to 120-degrees, and 90-degrees to 130-degrees. In some embodiments, the angles between the different parts of the switch assist 350 or the lengths of the different parts of the switch assist 350 may be changed in order to properly interact with and operate different flashlight models.

The pivot piece 358 may be a horizontal cylinder wider than the downwardly extending member 356. The interlocking pivot piece 358 may fit within a corresponding cavity 332 (FIG. 9). The cavity may be positioned within a recess 330 of handle 310 conformed to fit the switch assist 350 below the flashlight. The cavity 332 may be a 'T-shape' (when viewing from the top) so that the wider interlocking pivot piece 358 can slot down in the front/lower part of cavity 332 and then slide backwards to interlock the switch assist 350 to the handle 310 but allow the switch assist 350 to rotate and/or move forward and back at the pivot piece 358. In some embodiments, the cavity 332 may be configured cross-sectionally so that interlocking pivot piece 358 can slot downwards and then backwards within cavity 332 (e.g., similar to an 'L' shape).

In operation, switch assist 350 may have two functions. First, switch assist 350 may be used to turn on the flashlight temporarily. The hand of the user (e.g., the purlicue, or the skin in between index finger and thumb, or the user's thumb) may press on the top end 355*a* (or on the top half) of the upwardly extending member 353, which may then rotate the switch assist 350 upwards and forwards, such that the front side of upwardly extending member 353 may contact a button of the flashlight. The combination of pivot piece 358 and cavity 332 may act as a hinge around which the switch assist 350 may rotate. As the user holds the forward rotated position of the switch assist 350, the button of the flashlight may remain pressed, and the flashlight may remain on. The button of the flashlight may not be completely engaged (e.g., "clicked" to maintain continuous operation). As the user stops holding the forward rotated position of the switch assist 350, the switch assist 350 may return to a resting position, in which the button of the flashlight is not pressed, and the flashlight may turn off.

Second, the switch assist 350 may be used to turn the flashlight on constantly. The hand of the user (e.g., the purlicue, or the skin in between index finger and thumb, or the user's thumb) may press on the bottom end 355*b* (or on the bottom half) of the upwardly extending member 353, which may slide (or translate) switch assist 350 forward relative to handle 310 and the flashlight. The combination of the pivot piece 358 and cavity 332 may allow the switch assist 350 to slide forward while remaining engaged with handle 310. This may allow the front side of upwardly extending member 353 to contact a button on the back of the flashlight such that the button may be completely engaged (e.g., "clicked" to maintain continuous operation). Accordingly, the flashlight may maintain continuous operation while the button is engaged. To turn off the flashlight, the user may use their hand to press against the backslide of the upwardly extending member 353 to contact the button of the flashlight such that the button may be completely engaged (e.g., "clicked") to turn the flashlight off.

In some embodiments, handle 310 may further include a second cavity behind cavity 332. The second cavity may include a spring. The spring may contact the bottom side of the switch assist body 354 of the switch assist 350. The spring may contact the bottom side of the switch assist body 354 at the rearmost part of the front portion of the switch assist body 354. The spring may press upwardly on the switch assist 350, which may cause switch assist 350 to rotate forward. The spring may cause switch assist 350 to always be in contact with the button of the flashlight at the resting position, but not have enough force to activate the light without additional force from a user. Using the spring as part of the handle 310 may aid the user in operating the button of the flashlight using the switch assist 350. Using the spring as part of the handle 310 may also aid the user when mounting the flashlight to mount 320 by aiding the user in finding the ideal placement to align switch assist 350 with a button of the flashlight.

In some embodiments, the handle 310 and/or mount 320 of flashlight grip 300 may be universal or used with many different flashlight models. In some embodiments, the switch assist 350 may be specific to one flashlight model or multiple flashlight models. The switch assist 350 may be configured with specific lengths and angles of different components to ensure proper operation (as described above) with the button of the associated flashlight model.

Figure 10:
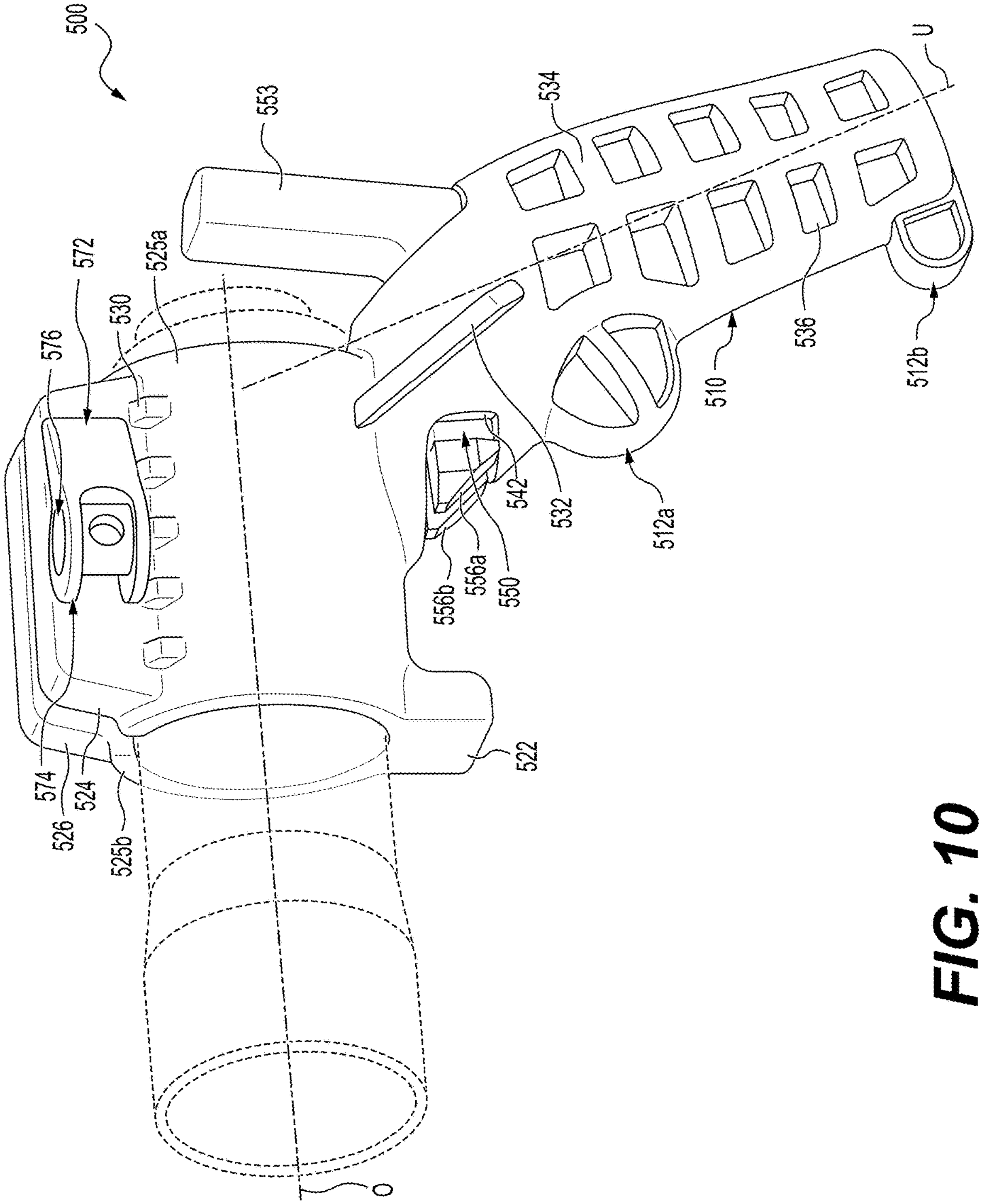
FIG. 10 is a perspective side view of a flashlight grip with a switch assist and a cam lever with a flashlight held within the device in accordance with certain embodiments of the disclosed technology.
Figure 11:
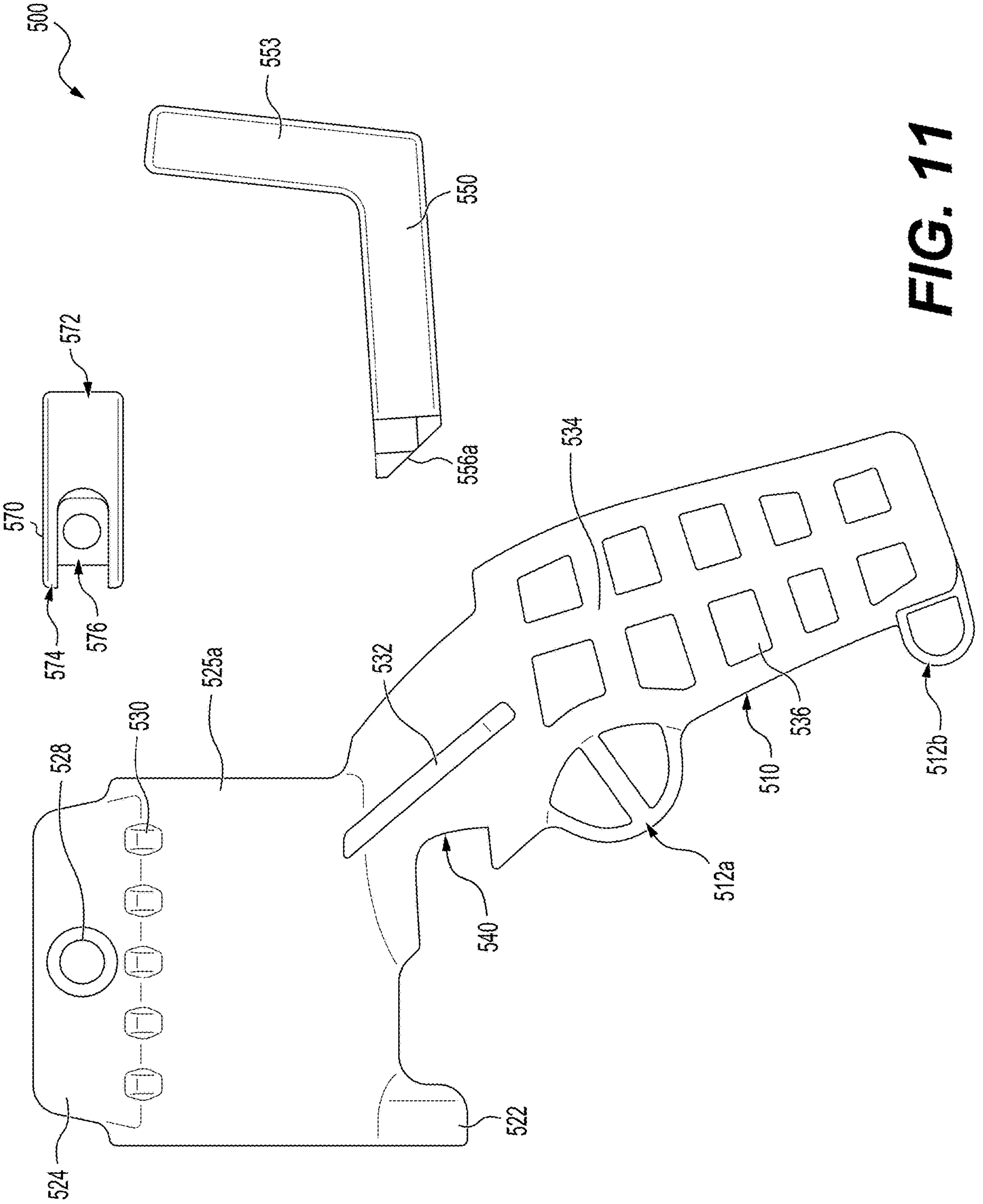
FIG. 11 is an exploded left side view of a flashlight grip with a switch assist and a cam lever in accordance with certain embodiments of the disclosed technology.
Figure 12:
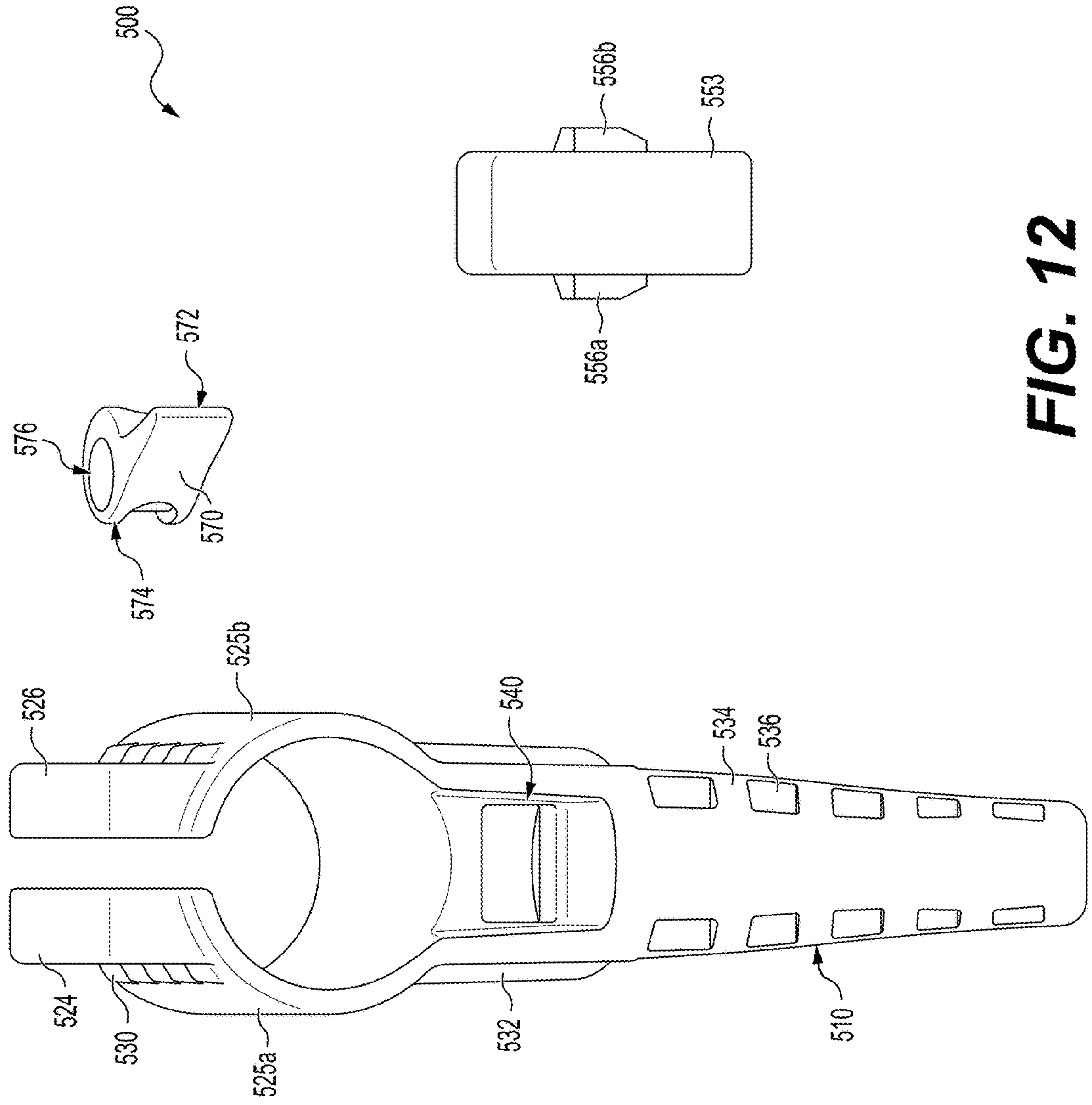
FIG. 12 is an exploded top back view of a flashlight grip with a switch assist and a cam lever in accordance with certain embodiments of the disclosed technology.

FIG. 10 is a perspective side view of an exemplary flashlight grip 500 used to hold a flashlight (shown in dotted lines) in accordance with some embodiments, which may be shown in further detail in FIGS. 11 and 12. Flashlight grip 500 may include a handle 510 with an integrated mount for a flashlight (combination of 525*a* and 525*b*). Handle 510 may be positioned longitudinally about axis U. The mount may be defined by a cavity for holding a flashlight. The cavity and/or flashlight may be positioned longitudinally about axis O. Axis U may be positioned at a specific angle from axis O in order for the user to easily operate the flashlight with the flashlight grip (e.g., to maintain a two-handed grip). For example, axis U may be positioned at about a 40-degree angle from perpendicular to axis O. Alternatively, the axis U may be positioned at about a 35-degree angle to about a 45-degree angle, about a 30-degree angle to about a 50-degree angle, or about a 25-degree angle to about a 55-degree angle from perpendicular to axis O. Accordingly, handle 510 may be positioned at about a 40-degree angle from perpendicular to the mount. Alternatively, handle 510 may be positioned at about a 35-degree angle to about a 45-degree angle, about a 30-degree angle to about a 50-degree angle, or about a 25-degree angle to about a 55-degree angle from perpendicular to the mount.

The handle 510 may have a generally straight form. Alternatively, the handle 510 may have a curved form to fit a hand of a user and to make the handle 510 more ergonomic. The handle 510 may include one or more grip points 512*a*, 512*b* to aid the user in maintaining a firm grasp of the handle 510. The one or more grip points 512*a*, 512*b* may be placed along the front side of the handle 510 and extend partially along the sides of the handle 510. The one or more grip points 512*a*, 512*b* may be semicircular, spherical, or cylindrical in shape to fit the curvature of a hand of the user, and to aid the user in maintaining a two-handed grip. The one or more grip points 512*a*, 512*b* may be spaced apart such that a user's fingers can tighten against grip points 512*a*, 512*b* for additional stability while maintaining a two-handed grip. The lowest of one or more grip points 512*b* may be positioned underneath a user's smallest finger to aid in pressing the fingers together while holding handle 510. Handle 510 may include one or more ergonomic features to make handle 510 more comfortable to hold or to aid the user in gripping the handle. Handle 510 may be designed to incorporate a wedge, wedge-like shape, or shape that performs the same action as wedge 315 of flashlight grip 300 to aid in performing a two-handed grip, as described with respect to flashlight grip 300.

Handle 510 may include a channel 540. The channel 540 may be configured for receiving a switch assist (e.g., switch assist 550). The channel 540 may have a rectangular cross section. The channel 540 may extend longitudinally through the entirety of the handle 510. The channel 540 may be angled downwardly towards the front of handle 510 such that the front of the channel is higher than the rear of the channel. The angle or slope of channel 540 may aid the switch assist 550 to return to a forward position when flashlight grip 500 is used. The inside of the channel 540 may have a flat top, bottom, left side and right side. The sides of the inside of the channel 540 may be configured to interact with one or more portions of switch assist 550. The front of the channel 540 may include one or more side features 542 on the left and right side. The side features 542 may be largely flat. The side features 542 may be configured to interact with clipping portions 556*a*, 556*b* of switch assist 550. The side features 542 may prevent switch assist 550 from being moved to rearward position (or removed from) channel 540. This may prevent the switch assist 550 from accidentally falling out of flashlight grip 500 or moving to an undesirable position. In some embodiments, the top, bottom, or sides of channel 540 may include guides or bumps to fit between clipping portions 556*a*, 556*b* of the switch assist 550 to help guide the switch and/or to limit the movement of the switch assist.

The mount may be of integral construction with handle 510. The mount may be configured in a general shape to receive a flashlight. The mount may be made of two portions, 525*a*, 525*b*, which may be two halves. Left portion (e.g., side) of mount 525*a* may be a mirror image of the right portion (e.g., side) of mount 525*b*. Together the two portions 525*a*, 525*b* of the mount may form a generally cylindrical shape, with a generally cylindrical cavity. The two portions 525*a*, 525*b* of the mount may form a generally circular or elliptical cross-section. The cavity may be configured for receiving a flashlight, as particularly shown in FIG. 10. The flashlight may have an exterior case of about 1 inch (or 25.4 mm) in diameter. In some embodiments, the mount may be constructed to accommodate different sizes of flashlight tubes (e.g., flashlights with 0.5 inch or 0.75 inch diameters). The two portions 525*a*, 525*b* may have a wall dimension (e.g., between the outer side of the cylinder and the inner side of the cavity) that is approximately even throughout. Left side of mount 525*a* may include a left mounting bar 524 with one or more holes 528. The one or more holes 528 may be countersunk. The one or more holes 528 may be threaded. The one or more holes may be configured to receive connectors. The one or more connectors may be threaded (e.g., a bolt, stud, nut). Right side of mount 525*b* may include a right mounting bar 526 which may be similar or complementary to left mounting bar 524. Right mounting bar 526 may include one or more holes for receiving one or more connectors. The holes 528 in the left mounting bar 524 may align with the holes of right mounting bar 526 to allow the one or more connectors to extend between the left mounting bar 524 and the right mounting bar 526. There may be a gap in between mounting bars 524, 526 and/or the two portions 525*a*, 525*b* of the mount. By using the one or more connectors to tighten against the mounting bars 524, 526, the two portions 525*a*, 525*b* of the mount may move closer together, narrowing the gap between the mounting bars and/or the two portions. This further allows the two portions 525*a*, 25*b* of the mount to tighten around the flashlight and restrict the flashlight from moving within the mount. The gap may be configured to be sufficient in size such that one or more connectors (e.g., a bolt or screw) and/or the two portions 525*a*, 525*b* of the mount have sufficient travel to alternate between a loose position (e.g., wherein the mount is loose around the flashlight, and a flashlight may be inserted or repositioned) and a tightened position (e.g., wherein the mount firmly surrounds the flashlight and prevents the flashlight from moving). The gap may be determined by thickness or flexibility of the material of the mount and/or the mounting bars 524, 526. The mount may include an end stop to block the flashlight from extending beyond a specified point. In some embodiments, the mount may be configured to tighten around or connect to a specific part of the flashlight. For example, the mount may be configured to surround a battery cap.

Mounting bars 524, 526 may be advantageously placed at the top of the mount. By placing the mounting bars 524, 526 at the top of the mount, the mounting bars 524, 526 minimize the lateral space needed between the flashlight grip 500 and the firearm. This may aid with alignment of the flashlight beam and the firearm barrel. Furthermore, a variety of connectors may be used to secure the flashlight in the mount. For example, in some embodiments, the holes (e.g., holes 528) of both mounting bars may be unthreaded and the connectors may be bolts extending through the holes of both mounting bars secured by a nut on the exterior side of a mounting bar. In another example, studs may be used with nuts on the exterior side of the mounting bars. Furthermore, the holes (e.g., holes 528) on one mounting bar may be threaded, while the holes on the other mounting bar may be unthreaded, allowing a bolt to extend through the unthreaded hole of the mounting bar of one side and thread into the threaded hole of the mounting bar of the other side. The bolt may be tightened against an outside edge of the mounting bar. In some embodiments, the flashlight grip may include one or more cam levers (e.g., cam lever 570, further shown in FIGS. 11 and 12). The cam lever 570 may be used to tighten or loosen the bolt, thereby reducing or widening the gap between the mounting bars 524, 526. The cam lever may include a lever portion 572 and a circular portion 574 containing a threaded insert 576. The threaded insert 576 may be threaded on a bolt extending through right mounting bar 526 and left mounting bar 524. The threaded insert 576 may be capable of rotating (either using an internal mechanism or within circular portion 574) such that a user may move lever portion 572 from a stowed position (e.g., lengthwise along a mounting bar, such as left mounting bar 524) to a winding position (e.g., extended substantially perpendicularly to left mounting bar 524). The lever portion 572 may aid the user in rotating the threaded insert 576 on a bolt to tighten or loosen the mount of flashlight grip 500 around a flashlight. The cam lever 570 may be positioned on the side of the flashlight grip 500 opposite the side closest to the firearm. This may allow the beam from the flashlight to be as close as possible to the barrel of the firearm (to aid in alignment).

The mount may further include a gripping aid 522. Gripping aid 522 may extend below the body of the mount (e.g., below the left portion 525*a* and right portion 525*b* of the mount). The gripping aid may be generally a rectangular prism shape. The gripping aid 522 may allow a user to place the index finger of their hand used to grip handle 510 in front of gripping aid 522 for additional support. By placing their index finger against a front of gripping aid 522, the gripping aid 522 may provide the user with an additional grip point from which to more easily move switch assist 550 (FIG. 11) or activate the light by contacting the button with their thumb or purlicue. In some embodiments, the gripping aid 522 may also provide a resting position for the user to place their index finger when not moving switch assist 550 (FIG. 11). For example, the user may rest the index finger of the hand holding handle 510 against a back side of the gripping aid 522 and in front of handle 510. The bottom of the mount may include a recess for inserting the clip of a flashlight.

In some embodiments, mounting bars 524, 526 and gripping aid 522 may help a user with handling flashlight grip 500 when reloading a firearm or correcting a firearm malfunction. For example, when reloading a firearm or correcting a firearm malfunction, the user may use their non-firing hand (e.g., the hand holding flashlight grip 500) to manipulate the firearm. In order to manipulate the firearm while holding the flashlight grip 500, the user may rotate the flashlight (within flashlight grip 500) in between their index and middle fingers of their non-firing hand. The user may press the middle or rear portions of their index and middle fingers against front surface of mounting bars 524, 526 and the front surface of gripping aid 522. By using mounting bars 524, 526 and gripping aid 522 in this way, the user may be able use the end of their index finger and thumb of their non-firing hand to manipulate the firearm as needed (e.g., to grip the slide, magazine, or bolt of the firearm), while still holding the flashlight grip 500. Once the user has completed manipulating the firearm as needed, the user may return to the two-handed grip. These elements of the flashlight grip 500 allow the user to quickly manipulate the firearm properly and avoid having to put down the flashlight grip 500 to manipulate the firearm. In some embodiments, mounting bars 524, 526 and gripping aid 522 may also allow the user to firmly grip the flashlight grip 500 (e.g., by pressing their index finger and middle fingers against the mounting bars 524, 526 and gripping aid 522 and pushing forward against the back of the handle 510 with the palm of the hand) in order to use flashlight grip 500 defensively in a tactical situation (e.g., to strike an attacker or the surface of an object).

Flashlight grip 500 may include one or more structural features. The structural features may be used to reduce the weight of the flashlight grip 500 while maintaining strength. The structural features may be of integral construction with flashlight grip 500. The flashlight grip 500 may include one or more gussets 530 between the mounting bars 524, 526 and the left portion 525*a* and/or right portion 525*b* of the mount. The gussets may increase the strength of the attachment of the mounting bars 524, 526 to the left portion 525*a* and/or right portion 525*b* of the mount (mounting bars 524, 526 may be of integral construction with the left portion 525*a* and right portion 526*b* respectively), which may have significant stress when tightened around a flashlight. The handle 510 may have recesses 536 accompanied by integrated bracing 534. The one or more grip points 512*a*, 512*b* may also include recesses and integrated bracing similar to that of the handle. Flashlight grip 500 may include a side brace 532 on both or either side. The side brace 532 may further strength or support the flashlight grip 500 around the channel 540.

FIG. 11 is an exploded left side view of a flashlight grip 500 with a switch assist 550 and cam lever 570. FIG. 12 is an exploded top back view of the same flashlight grip 500 with the switch assist 550 and cam lever 570. In some embodiments, the switch assist 550 and cam lever 570 may be optional. The switch assist 550 may include a switch assist body, which may have multiple portions. The upwardly extending member 553 may be connected to an end of switch assist body. The angle between the switch assist body and the upwardly extending member 553 may be greater than 90 degrees. In some embodiments, the angle between the switch assist body and the upwardly extending member 553 may be between 80 degrees and 100 degrees. In some embodiments, the angle between the switch assist body and the upwardly extending member 553 may be between 85 degrees and 95 degrees. The angle between the switch assist body and the upwardly extending member 553 may vary for operation with different flashlights. The upwardly extending member 553 may be used to contact a power button of a flashlight to operate the flashlight (e.g., turn the flashlight on or off). The upwardly extending member 553 may or may not have a specific portion for contacting the button of the flashlight (e.g., similar to button contactor 152). The switch assist 550 may be configured to slide forward and rearward within channel 540. Channel 540 may have a complementary size and shape to accommodate switch assist 550. The switch assist 550 may include a first clipping portion 556*a* and a second clipping portion 556*b*. There may be a gap (e.g., a distance) in between clipping portions 556*a*, 556*b*. The clipping portions 556*a*, 556*b* may be able to bend towards each other in order to be inserted into channel 540. Once inserted and pushed through channel 540, the clipping portions 556*a*, 556*b* may expand outwardly (away from each other). Once expanded, the clipping portions 556*a*, 556*b* may engage with side features 542 to prevent the switch assist 550 from moving rearwardly beyond a certain point. Channel 540 may guide the switch assist 550 as it translates forward and rearward relative to the flashlight grip 500. This may allow the user to press on the switch assist 550 to push the switch assist forward to operate a button of the flashlight. Features of the channel 540 may interact with features of the switch assist 550 to aid in guiding the switch assist (e.g., a guide or raised surface at the bottom of the channel configured to be between a rear part of the clipping portions 556*a*, 556*b*.

To remove the switch assist 550 from the flashlight grip 500, a user may press the clipping portions 556*a*, 556*b* together such that the outside edges of the clipping portions are within the interior sides of the channel 540. The user may then push the switch assist 550 rearward to remove the switch assist (e.g., if exchanging a first switch assist for use with a first flashlight for a second switch assist for use with a second flashlight). By using a straight channel and straight switch assist (e.g., switch assist 550), many different switch assists may be used or with flashlight grip 500 to accommodate multiple different flashlights or features.

In operation, switch assist 550 may have two functions. First, switch assist 550 may be used to turn on the flashlight temporarily. The hand of the user (e.g., the purlicue, or the skin in between index finger and thumb, or the user's thumb) may press on upwardly extending member 553, which may then slide the switch assist 550 forwards, such that the front side of upwardly extending member 553 may contact a button of the flashlight. As the user holds the forward position of the switch assist 550, the button of the flashlight may remain pressed, and the flashlight may remain on. The button of the flashlight may not be completely engaged (e.g., "clicked" to maintain continuous operation). As the user stops holding the forward position of the switch assist 550, the switch assist 550 may return to a resting position, in which the button of the flashlight is not pressed, and the flashlight may turn off.

Second, the switch assist 550 may be used to turn the flashlight on constantly. The hand of the user (e.g., the purlicue, or the skin in between index finger and thumb, or the user's thumb) may press on upwardly extending member 353, which may slide switch assist 550 forward relative to handle 510 and the flashlight. This may allow the front side of upwardly extending member 553 to contact a button on the back of the flashlight such that the button may be completely engaged (e.g., "clicked" to maintain continuous operation). Accordingly, the flashlight may maintain continuous operation while the button is engaged. To turn off the flashlight, the user may use their hand to press against the backslide of the upwardly extending member 553 to contact the button of the flashlight such that the button may be completely engaged (e.g., "clicked") to turn the flashlight off.

In some embodiments, the handle 510 and/or mount of flashlight grip 500 may be universal or used with many different flashlight models. In some embodiments, the switch assist 550 may be specific to one flashlight model or multiple flashlight models. The switch assist 550 may be configured with specific lengths and angles of different components to ensure proper operation (as described above) with the button of the associated flashlight model.

In some embodiments, flashlight grip 500 may include a safety stop that prevents forward travel of the switch assist 550. Accordingly, the safety stop may prevent accidental operation of the flashlight by preventing the switch assist 550 from traveling forward to contact a power button of a flashlight. This may operate by using a portion of channel 540 or gripping aid 522 to block the forward motion of the switch assist 550 when the safety stop is engaged. When the safety stop is released, the switch assist 550 may be able to travel forward to contact the power button of the flashlight, allowing the flashlight to operate.

In some examples, disclosed systems or methods may involve one or more of the following clauses:

Clause 1: A flashlight grip comprising: a handle comprising: a lower mount configured to hold a flashlight, one or more handle mounting bars disposed lengthwise along the lower mount, a handle partial ring, and a shaft coupled to the lower mount; a top comprising: an upper mount, a top partial ring, and one or more top mounting bars disposed lengthwise along the upper mount, the one or more top mounting bars and top partial ring complementary to the handle mounting bars and handle partial ring; and one or more connectors extending through the top mounting bars and the handle mounting bars and configured to secure a flashlight in between the handle and the top.

Clause 2: The flashlight grip of clause 1, further comprising: a switch assist, the switch assist coupled to the handle and positioned between a switch of a flashlight and a purlicue of a hand of a user to allow a movement of the purlicue to operate the switch of a flashlight.

Clause 3: The flashlight grip of clause 2, further comprising: a safety stop to prevent accidental activation of the switch of a flashlight, wherein the safety stop blocks forward travel of the switch assist.

Clause 4: The flashlight grip of clause 3, wherein the safety stop blocks the forward travel of the switch assist by interacting with the handle partial ring.

Clause 5: The flashlight grip of clause 4, wherein the safety stop is released by pressing on a lever, the lever allowing the safety stop to move in front of the handle partial ring.

Clause 6: The flashlight grip of clause 1, wherein: a lower cavity is formed in the lower mount, a upper cavity is formed in the upper mount, the handle partial ring and the top partial ring allow a user to apply pressure to a switch of a flashlight, the shaft comprises one or more grip points, and a back of the shaft comprises one or more recesses to aid a user in maintaining a two-handed grip.

Clause 7: The flashlight grip of clause 1, wherein the shaft is positioned at about a 40-degree angle from perpendicular to the lower mount.

Clause 8: The flashlight grip of clause 1, wherein the handle further comprises a cutout for a flashlight clip at a bottom of the lower mount.

Clause 9: The flashlight grip of clause 1, wherein: the handle is foldable, and the handle and grip are made from a bendable material.

Clause 10: A flashlight grip comprising: a handle comprising: a lower mount configured to hold a flashlight, the lower mount forming a lower cavity, one or more handle mounting points disposed lengthwise along the lower mount adjacent to the lower cavity, and a shaft coupled to the lower mount; a top comprising: an upper mount, the upper mount forming an upper cavity, and one or more top mounting points disposed lengthwise along the upper mount adjacent to the upper cavity, the one or more top mounting points complementary to the one or more handle mounting points; and wherein the handle and top are configured to secure a flashlight.

Clause 11: The flashlight grip of clause 10, further comprising one or more connectors, wherein the one or more connectors extend through the top mounting points and the handle mounting points.

Clause 12: The flashlight grip of clause 11, wherein the one or more connectors are screws, bolts, or combinations thereof.

Clause 13: The flashlight grip of clause 10, wherein the handle further comprises a semicircular handle ring and the top comprises a corresponding semicircular top ring, and wherein the handle ring and the top ring allow a user to apply pressure to a switch of a flashlight.

Clause 14: The flashlight grip of clause 10, wherein the handle and the top use a cam lever to secure a flashlight.

Clause 15: A flashlight grip comprising: a handle comprising: a lower mount configured to hold a flashlight, and a shaft; an upper portion complementary to the handle; and a tightening mechanism configured to secure the upper portion around a flashlight to the handle.

Clause 16: The flashlight grip of clause 15, wherein the shaft is positioned at about a 40-degree angle from perpendicular to the lower mount.

Clause 17: The flashlight grip of clause 15, wherein the tightening mechanism is a cam lever.

Clause 18: The flashlight grip of clause 15, wherein the tightening mechanism is one or more screws, bolts, or combinations thereof.

Clause 19: The flashlight grip of clause 15, wherein: the shaft comprises one or more grip points; the shaft comprises a back; the back of the shaft comprises one or more recesses to aid a user in maintaining a two-handed grip; and the handle further comprises a cutout for a flashlight clip at a bottom of the lower mount.

Clause 20: The flashlight grip of clause 15, further comprising: a switch assist, the switch assist attached to the handle and positioned between a switch of a flashlight and a purlicue of a hand of a user to allow a movement of the purlicue to operate the switch of a flashlight; and a safety stop to prevent accidental activation of the switch of a flashlight, wherein the safety stop blocks forward travel of the switch assist.

Clause 21: A flashlight grip comprising: a handle; a first mounting portion coupled to the handle and comprising a first mounting bar disposed lengthwise along the first mounting portion; a second mounting portion coupled to the handle and comprising a second mounting bar disposed lengthwise along the second mounting portion, the second mounting portion positioned opposite the first mounting portion, and the first mounting portion and second mounting portion forming a cavity; and one or more connectors extending through the first mounting bar and the second mounting bar, wherein the one or more connectors are configured to secure a flashlight in between the first mounting portion and the second mounting portion.

Clause 22: The flashlight grip of clause 21, wherein: the handle further comprises a channel for receiving a switch assist, the switch assist configured to slide within the channel and positioned between a switch of a flashlight and a purlicue of a hand of a user to allow a movement of the purlicue to operate the switch of a flashlight.

Clause 23: The flashlight grip of clause 22, wherein: the switch assist comprises a first clipping portion and a second clipping portion, the first clipping portion is configured to engage with at least a first portion of the channel, the second clipping portion is configured to engage with at least a second portion of the channel, and the first clipping portion and the second clipping portion are configured to hold the switch assist within the channel.

Clause 24: The flashlight grip of clause 23, wherein: the first clipping portion and the second clipping portion are pressed together to insert the switch assist into the channel.

Clause 25: The flashlight grip of clause 22, further comprising: a safety stop to prevent accidental activation of the switch of a flashlight, wherein the safety stop blocks forward travel of the switch assist.

Clause 26: The flashlight grip of clause 21, wherein: the one or more connectors are tightened by a cam lever, the first mounting portion and the second mounting portion are of integral construction with the handle, and the first mounting portion and the second mounting portion are configured to bend towards each other when the one or more connectors are tightened to secure the flashlight.

Clause 27: The flashlight grip of clause 26, wherein: when the one or more connectors are tightened, a gap between the first mounting portion and the second mounting portion is reduced, the handle is foldable, the handle and grip are made from a bendable material, the handle further comprises a recess for a flashlight clip at a bottom of the cavity.

Clause 28: The flashlight grip of clause 21, wherein: a gripping aid disposed below the first mounting portion and the second mounting portion allow a user to apply pressure to a switch of a flashlight, the handle comprises one or more grip points, the handle comprises one or more recesses, and the handle comprises one or more supporting structures.

Clause 29: The flashlight grip of clause 21, wherein a first axis of the handle is positioned at about a 40-degree angle from perpendicular a second axis of the cavity.

Clause 30: A flashlight grip comprising: a handle comprising a channel; a first mounting portion coupled to the handle; a second mounting portion coupled to the handle and positioned opposite the first mounting portion, the first mounting portion and second mounting portion forming a cavity; a tightening mechanism configured to reduce a distance from the first mounting portion to the second mounting portion to secure a flashlight in between the first mounting portion and the second mounting portion; and a switch assist sliding within the channel and configured to engage a button of the flashlight.

Clause 31: The flashlight grip of clause 30, further comprising one or more connectors extending between the first mounting portion to the second mounting portion, the tightening mechanism configured to engage with the one or more connectors.

Clause 32: The flashlight grip of clause 31, wherein: the one or more connectors are screws, bolts, or combinations thereof, and the tightening mechanism is a cam lever.

Clause 33: The flashlight grip of clause 30, wherein: the switch assist comprises a first clipping portion and a second clipping portion, the first clipping portion is configured to engage with at least a first portion of the channel, the second clipping portion is configured to engage with at least a second portion of the channel, and the first clipping portion and the second clipping portion are configured to hold the switch assist within the channel.

Clause 34: The flashlight grip of clause 33, wherein: the first clipping portion and the second clipping portion are pressed together to insert the switch assist into the channel.

Clause 35: A flashlight grip comprising: a handle; a mount coupled to the handle comprising at least two portions, the at least two portions forming a cavity for receiving a flashlight; one or more connectors extending through the at least two portions; and one or more cam levers engaging the one or more connectors to tighten the at least two portions around the flashlight to secure the flashlight within the cavity of the mount.

Clause 36: The flashlight grip of clause 35, wherein: a first axis of the handle is positioned at about a 40-degree angle from perpendicular to a second axis of the cavity, and at least a first portion of the at least two portions of the mount is of integral construction with the handle.

Clause 37: The flashlight grip of clause 35, wherein the handle comprises: one or more grip points; one or more recesses to aid a user in maintaining a two-handed grip; and a recess for a flashlight clip at a bottom of the cavity.

Clause 38: The flashlight grip of clause 35, further comprising: a switch assist, the switch assist in selective communication with the handle and positioned between a switch of a flashlight and a purlicue of a hand of a user to allow a movement of the purlicue to operate the switch of a flashlight.

Clause 39: The flashlight grip of clause 38, wherein: the switch assist comprises a first clipping portion and a second clipping portion, the first clipping portion is configured to engage with at least a first portion of a channel longitudinally positioned within the handle, the second clipping portion is configured to engage with at least a second portion of the channel, and the first clipping portion and the second clipping portion are configured to hold the switch assist within the channel.

Clause 40: The flashlight grip of clause 38, further comprising: a safety stop to prevent accidental activation of the switch of a flashlight, wherein the safety stop blocks forward travel of the switch assist.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems and/or methods.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A grip for a flashlight comprising:

a single-bodied handle of integral construction with a first mounting portion and a second mounting portion;

the first mounting portion above the handle and comprising a first mounting bar disposed lengthwise along the first mounting portion;

the second mounting portion above the handle and comprising a second mounting bar disposed lengthwise along the second mounting portion, the second mounting portion positioned opposite the first mounting portion, and the first mounting portion and second mounting portion forming a cavity;

one or more connectors extending through the first mounting bar and the second mounting bar, wherein the one or more connectors are configured to secure the flashlight within the cavity;

a channel within the handle and below the first mounting portion and the second mounting portion and extending from a front to a rear of the handle; and a switch assist movable within the channel with one or more clipping portions, the clipping portions configured to engage with an opening at a front of the channel, and the switch assist configured to engage with a switch at a rear end of the flashlight.

2. The flashlight grip for a flashlight of claim 1, wherein:

the switch assist is positioned between the switch of a flashlight and a purlicue of a hand of a user to allow a movement of the purlicue to operate the switch at the rear end of the flashlight opposite a beam of the flashlight.

3. The grip for a flashlight of claim 1, wherein:

the switch assist comprises a first clipping portion and a second clipping portion positioned opposite each other, the first clipping portion is configured to engage with at least a first portion of the channel, the second clipping portion is configured to engage with at least a second portion of the channel, the first clipping portion and the second clipping portion are configured to hold the switch assist within the channel, and the first clipping portion and second clipping portion restrict rearward travel of the switch assist.

4. The grip for a flashlight of claim 3, wherein:

the first clipping portion and the second clipping portion are pressed together to insert the switch assist into the channel.

5. The grip for a flashlight of claim 2, further comprising:

a safety stop to prevent accidental activation of the switch of the flashlight, wherein the safety stop blocks forward travel of the switch assist.

6. The grip for a flashlight of claim 1, further comprising:

a mechanism for tightening the one or more connectors to cause the first mounting portion and the second mounting portion to bend towards each other, reducing a gap between the first mounting portion and the second mounting portion to secure the flashlight within the cavity, and wherein:

the switch assist further comprises an upwardly extending member comprising a protrusion for contacting the switch of the flashlight, the flashlight is a flashlight model of one or more flashlight models, and the switch assist is specific to a flashlight model of the one or more flashlight models.

7. The grip for a flashlight of claim 6, wherein:

the handle is foldable, the grip is made from a bendable material, the mechanism for tightening the one or more connectors is a cam lever, and the handle further comprises a recess for a flashlight clip at a bottom of the cavity.

8. The grip for a flashlight of claim 1, wherein:

a gripping aid disposed below the first mounting portion and the second mounting portion allows a user to apply pressure to the switch of the flashlight, the handle comprises one or more grip points, the handle comprises one or more recesses, and the handle comprises one or more supporting structures.

9. The grip for a flashlight of claim 1, wherein a first axis of the handle is positioned at about a 40-degree angle from perpendicular a second axis of the cavity.

10. A grip for a flashlight comprising:

a single-bodied handle comprising a channel extending from a front to a rear of the handle;

a first mounting portion of integral construction with the handle;

a second mounting portion of integral construction with the handle and positioned opposite the first mounting portion, the first mounting portion and second mounting portion forming a cavity;

a tightening mechanism configured to reduce a distance from the first mounting portion to the second mounting portion to secure a flashlight in the cavity; and a switch assist sliding within the channel and comprising two clipping portions positioned opposite from each other, each clipping portion extending through the channel to the front of handle and engaging with a channel opening to restrict rearward travel of the switch assist, the switch assist configured to engage a button at a rear end of the flashlight.

11. The grip for a flashlight of claim 10, wherein:

the tightening mechanism is configured to bend the first mounting portion and the second mounting portion towards each other to reduce the distance from the first mounting portion to the second mounting portion, and further comprising one or more connectors extending between the first mounting portion to the second mounting portion, the tightening mechanism configured to engage with the one or more connectors, and wherein:

the flashlight is a flashlight model of one or more flashlight models, and the switch assist is specific to a flashlight model of the one or more flashlight models.

12. The grip for a flashlight of claim 11, wherein:

the one or more connectors are screws, bolts, or combinations thereof, and the tightening mechanism is a cam lever.

13. The grip for a flashlight of claim 10, wherein:

the channel is aligned with a lengthwise axis of the flashlight, the first clipping portion is configured to engage with at least a first portion of the channel, the second clipping portion is configured to engage with at least a second portion of the channel, and the first clipping portion and the second clipping portion are configured to hold the switch assist within the channel.

14. The grip for a flashlight of claim 13, wherein:

the first clipping portion and the second clipping portion are pressed together to insert the switch assist into the channel, and the first clipping portion and the second clipping portion are pressed together to allow for additional rearward travel when removing the switch assist from the channel.

15. A flashlight grip comprising:

a single-bodied handle comprising a channel with an opening at a front of the handle;

a mount of integral construction with the handle and comprising at least two portions, the at least two portions forming a cavity for receiving a flashlight;

one or more connectors extending through the at least two portions;

one or more mechanisms for engaging the one or more connectors to tighten the at least two portions around the flashlight to secure the flashlight within the cavity of the mount; and a switch assist configured to travel within the channel and comprising at least one clipping portion engaging with the opening.

16. The flashlight grip of claim 15, wherein:

the one or more mechanisms comprise one or more cam levers, a first axis of the handle is positioned at about a 40-degree angle from perpendicular to a second axis of the cavity.

17. The flashlight grip of claim 15, wherein the handle comprises:

one or more grip points;

one or more recesses to aid a user in maintaining a two-handed grip; and a recess for a flashlight clip at a bottom of the cavity.

18. The flashlight grip of claim 15, wherein the switch assist is positioned between a switch of the flashlight and a purlicue of a hand of a user to allow a movement of the purlicue to operate the switch of a the flashlight, the switch positioned opposite a beam of the flashlight.

19. The flashlight grip of claim 18, wherein:

the switch assist comprises a first clipping portion and a second clipping portion positioned opposite each other, the first clipping portion is configured to engage with at least a first portion of the channel longitudinally positioned within the handle, the second clipping portion is configured to engage with at least a second portion of the channel, the first clipping portion and the second clipping portion are configured to hold the switch assist within the channel, and the first clipping portion and second clipping portion restrict rearward travel of the switch assist.

20. The flashlight grip of claim 18, further comprising:

a safety stop to prevent accidental activation of the switch of the flashlight, wherein the safety stop blocks forward travel of the switch assist.

* * * * *